Oct. 7, 1969     E. GAEUMANN ET AL     3,471,476
TRIHYDROXAMIC ACIDS
Filed May 18, 1964     8 Sheets-Sheet 7

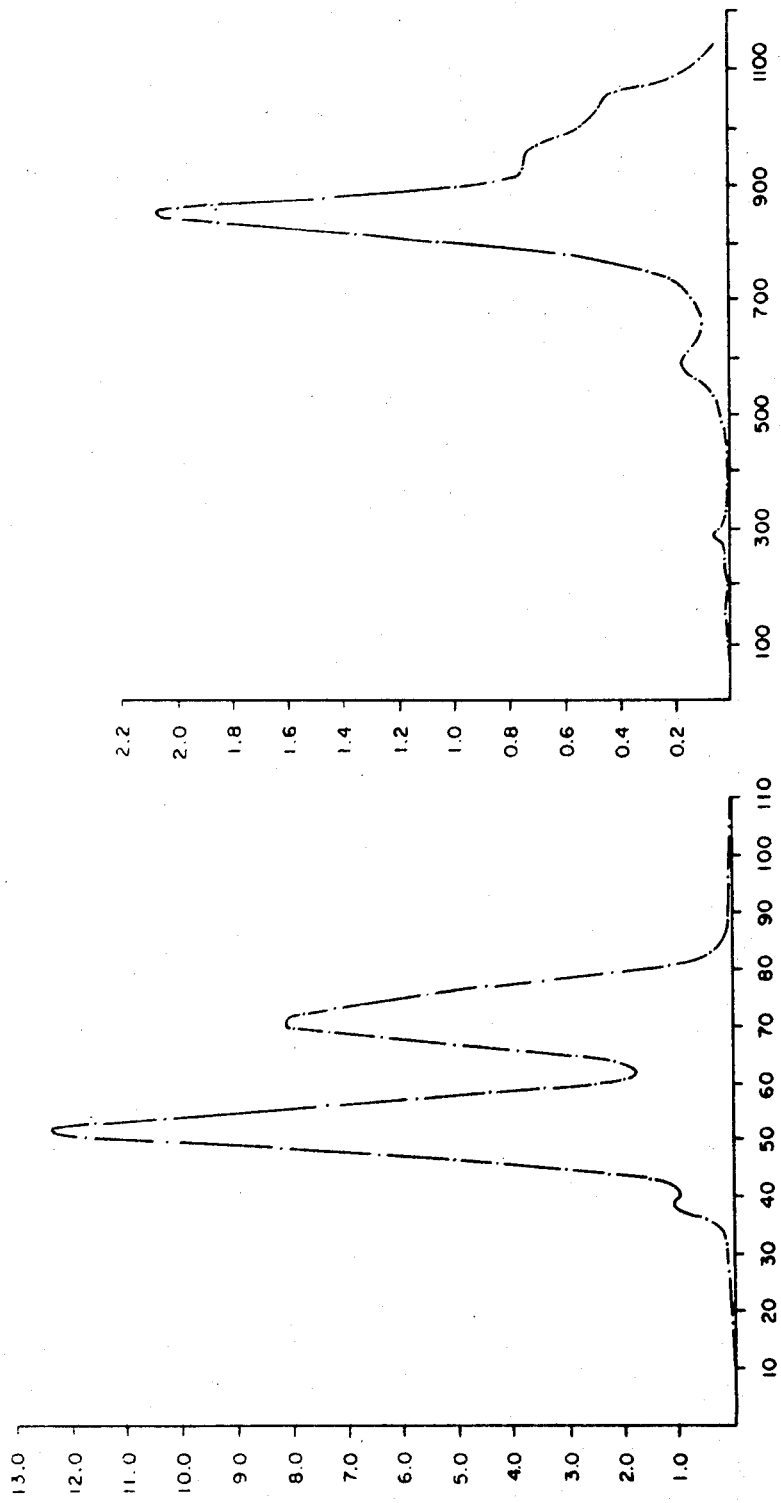

United States Patent Office 3,471,476
Patented Oct. 7, 1969

3,471,476
TRIHYDROXAMIC ACIDS
Ernst Gaeumann, deceased, late of Zurich, Switzerland, by Tino Gaeumann, legal representative, Zurich, Switzerland, Vladimir Prelog, Zurich, Hans Bickel, Binningen, and Ernst Vischer, Basel, Switzerland, assignors to Ciba Corporation, New York, N.Y., a corporation of Delaware
Continuation-in-part of application Ser. No. 292,443, July 2, 1963, which is a continuation-in-part of application Ser. No. 144,325, Oct. 11, 1961, which is a continuation-in-part of applications Ser. No. 57,834, Sept. 22, 1960, and Ser. No. 184,870, Apr. 3, 1962. This application May 18, 1964, Ser. No. 368,424
Claims priority, application Switzerland, Sept. 25, 1959, 78,652/59, 78,653/59; Mar. 18, 1960, 3,063/60, 3,064/60; Oct. 11, 1960, 11,395/60; Nov. 23, 1960, 13,147/60; Apr. 7, 1961, 4,075/61; Apr. 26, 1961, 4,885/61; May 18, 1961, 5,831/61; June 29, 1961, 7,598/61; July 6, 1962, 8,185/62; Aug. 10, 1961, 9,409/61; Aug. 11, 1961, 9,451/61; Sept. 14, 1961, 10,685/61
Int. Cl. C07d 41/00
U.S. Cl. 260—239.3
10 Claims

ABSTRACT OF THE DISCLOSURE

The invention is concerned with compounds of the formula

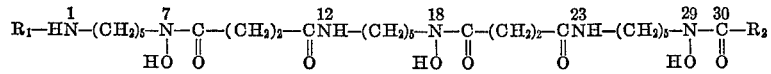

in which $CO-R_2$ represents carboxylic acid acyl and $R_1$ stands for a member selected from the group consisting of hydrogen, carboxylic acid acyl, m-dinitrophenyl and, together with $CO-R_2$, for succinyl in which the second carboxyl is combined with the $N_1$-atom to form a lactam, each of said carboxylic acid acyl groups being a member selected from the group consisting of alkanoyl, alkenoyl, succinyl, esterified succinyl, glutaryl, ethoxycarbonyl, amino-carbonyl, ethylamino-carbonyl, natural α-aminocarboxylic acid acyl, benzoyl, salicyl, p-hydroxy-benzoyl, dihydroxy-benzoyl, p-ethoxy-benzoyl, p-ethoxy-ethoxy-benzoyl, p-ethoxy-ethyleneoxy-benzoyl, naphthoyl, phthaloyl, carbobenzoxy and phenylacetyl. Also included are salts of these compounds and heavy metal complexes of them. In addition, the invention includes pharmaceutical preparations containing the above-identified materials. The compounds of the invention are useful as growth-promoting substances.

This is a continuation-in-part of our application Ser. No. 292,443, filed July 2, 1963, now U.S. Patent No. 3,247,197, which is itself a continuation-in-part of our application Ser. No. 144,325, filed Oct. 11, 1961, which in turn is a continuation-in-part of our application Ser. No. 57,834, filed Sept. 22, 1960, now U.S. Patent No. 3,153,-621, and of our application Ser. No. 184,870, filed Apr. 3, 1962.

A large number of biologically and physiologically active substances have already been isolated from materials of biological origin, especially plant material, animal organs and micro-organisms. Nothing, however, was known of the wide-spread occurrence of a certain group of growth-promoting substances.

The present invention is based on the observation that from plant organisms, particularly Actinomycetes, and from extracts thereof growth-promoting substances in pure or enriched form can be obtained which are hereinafter referred to as ferrioxamines.

The ferrioxamines are organic compounds containing nitrogen and iron. They are of brownish red color and readily soluble in acids and strongly polar solvents, such as water, dimethyl-formamide, glycol, ethyleneglycol-mono-methyl-ether as well as in lower aliphatic alcohols, such as methanol. They are further restrictedly soluble in higher aliphatic alcohols, and in aromatic alcohols and phenols, for example in butanol, benzyl alcohol and phenol. The hydrolysates of the ferrioxamines contain substances of positive reaction to ninhydrin. Chemically, the ferrioxamines are related to a group of antibiotic substances, called "Sideramycins." To the sideramycins belong, inter alia, the iron-containing antibiotics grisein, albomycin, the ferrimycins, the antibiotic 1787 (H. Thrum, Naturwiss. 44, page 561 (1957) and the substances L.A. 5352 and L.A. 5937 (P. Sensi and M. T. Timbal, Antibiotics and Chemotherapy 9, page 160 (1959)).

Crude ferrioxamine which for instance is obtained in the course of fermentation of streptomycetes is usually a mixture of various components. Ferrioxamine B is the main product of the ferrioxamines formed during the fermentation of S. pilosus Ettlinger et al. NRRL 2857 (ETH 21748). In addition, other substances are produced which are designated ferrioxamines A, C, $D_1$, $D_2$, E and F. By Craig's distribution of the crude product obtained from the culture filtrate (2 to 10 day's fermentation at 27° C.) by extraction with a mixture of phenol and chloroform (1 g.: 1 cc.), 5 fractions are obtained whose extinction at 425 mμ is shown in FIG. 1. From the main fraction III there is obtained by chromatography on the ion exchange resin Dowex 50–WX$_2$ pure ferrioxamine B hydrochloride as a brown-red powder (FIG. 2, fractions 93–125).

Ferrioxamine B hydrochloride is soluble in water and strongly polar organic solvents. In paper chromatography and multiple distribution it behaves as a uniform substance of similar polarity to ferrimycin $A_1$ and $A_2$, but differs from these by its considerably greater stability. In a weak acetic acid solution it travels in the course of electrophoresis with only a slightly lower speed than the ferrimycins.

The following properties were found for ferrioxamine B hydrochloride: Microanalysis after 48 hours at 20° C. under 0.001 mm. of pressure: C, 46.17%; H, 7.46%; N, 12.90%; Cl, 5.29%; Fe, 8.54%; P, 0%; S, 0%. Titration: pK*$_{NCS}$ (Helv. 37, 1872, (1954)); 9.74; equivalent weight: 704. Absorption spectrum in water: λ max 430 mμ with $$E^{1\%}_{1cm.} = 39.0$$

Infrared spectrum in heavy paraffin oil inter alia bands at 3230, 2900, 1640, 1573, 1461, 1377, 1260, 1225, 1185, 1132, 1028 cm.$^{-1}$ double bands at 989, 975, 935, 810, 750 cm.$^{-1}$; see FIG. 3. Partition coefficient, paper-chromatography and paperelectrophoresis. (See Table 1, FIG. 4 and FIG. 5.)

In the course of hydrolysis with dilute hydrochloric acid the following compounds can, inter alia, be identified: succinic acid, 1 - amino-5-hydroxylamino-pentane, cadaverine and hydroxylamine. When the hydrolysis is carried out with hydriodic acid, neither 1 - amino-5-hydroxylamino-pentane nor hydroxylamine is formed. When reacted with 2:4 - dinitrofluorobenzene, ferrioxamine B forms a 2:4-dinitro-phenyl derivative.

From the by-fractions II, IV and V (cf. FIG. 1) obtained by Craig's distribution of the crude ferrioxamine mixture there can be isolated by chromatography on ion exchange columns further compounds containing iron and having antisideramycin activity (see below). According to their behaviour in paper chromatography (FIG. 4) and on ion exchange columns they are designated ferrioxamine A, C, $D_1$, $D_2$ E and F, respectively.

Ferrioxamines A and C isolated from fractions II and IV respectively (cf. FIG. 1) are in their physical-chemical behaviour very similar to ferrioxamine B. In paper chromatography and in multiple distribution A is slightly more polar than B. In the case of C it is the other way round. This finding corresponds to the slightly increased basicity of A as compared with B and its slightly greater electrophoretic migration velocity in weak acetic acid solution, and to the slighter basicity and electric mobility of C as compared with B, respectively (FIG. 5). A and C also show infra-red spectra and solubility properties similar to ferrioxamine B and, like the latter, could till now only be obtained as hydrochlorides in amorphous form.

Ferrioxamine A hydrochloride is a brown-red powder which is readily soluble in water, methanol, alcohol, glacial acetic acid and dimethylformamide. It is insoluble in ether, acetone, ethyl acetate and chloroform. $R_f$ in solvent system I: 0.35, in solvent system V: 0.21. (Table I) Partition coefficient in system VI: 0.111 (Table I). Paper electrophoresis cf. FIG. 5. Microanalysis: C, 44.21%, H, 7.52%, N, 12.63%, Fe, 7.95%, Cl, 5.93%. Titration: $pK_{MCS}$: 9.79, equivalent weight: 634. Ultraviolet spectrum in water: λ max 430 mμ

$$(E^{1\%}_{1\,cm.} = 37)$$

The infrared spectrum in potassium bromide shows: inter alia bands at 2.92 μ(s.), 3.42 μ(m.), 6.10 μ(s.), 6.32 μ(s.), 6.88 μ(m.), 7.30 μ(w.), 79.2 μ(w.), 8.10 μ(w.), 8.49 μ(w.), 8.98 μ(w.), 9.55 μ(w.), 10.15 μ(w.), 10.67 μ(w.) (see FIG. 11).

Ferrioxamine A gives a positive color reaction with ninhydrin. The iron bound in ferrioxamine A is removed from the complex when subjected to the action of a mineral acid or of strong alkali. Iron free ferrioxamine A is colorless. It can be transformed back to ferrioxamine A with ferric chloride. It reacts also with other metal ions with formation of the corresponding metal complexes, for example the greenish colored copper-complex. For further characteristics see Table 1.

Ferrioxamine C hydrochloride shows approximately the same solubilities as A. $R_f$ in solvent system I: 0.54, in solvent system V: 0.37 (Table I). Paper electrophoresis see FIG. 5; partition coefficient in system VI: 0.489 (Table I). Microanalysis: C, 48.33%, H, 7.92%, N, 10.20%, Cl. 5.15%, Fe, 6.82. Titrations $pK_{MCS}$: 8.88; equivalent weight 762. Ultraviolet spectrum in water: λ max 430 mμ

$$(E^{1\%}_{1\,cm.} = 39)$$

The infrared spectrum in potassium bromide shows inter alia bands at: 2.92μ (s.), 3.43μ (s.), 5.85μ (m.), 6.10μ (s.), 6.33μ (s.), 6.87μ (s.), 7.30μ (m.), 7.95μ (m.), 8.23μ (w.), 8.52μ (m.), 9.65μ (w.), 13.23μ (m.) (see FIG. 12).

Ferrioxamine C gives a positive color reaction with ninhydrin. The iron bound in ferrioxamine C is removed from the complex when subjected to the action of a mineral acid or of strong alkali. Iron free ferrioxamine C is colorless. It can be transformed back to ferrioxamine C with ferric chloride. It reacts also with other metal ions with formation of the corresponding metal complexes, for example the greenish colored copper-complex.

The lipophilic ferrioxamines $D_1$, $D_2$ and E isolated by ion exchange chromatography from fraction V (FIG. 1), which in the solvent systems V and VI (Table I) show greater $R_f$ values than 0.5 and distribution coefficients above 1, behave as neutral compounds in electrophoresis and titration (cf. Table 1, FIG. 4 and FIG. 5). Ferrioxamine D which is isolated by ion exchange chromatography as the most rapidly travelling substance from a band appearing uniform (cf. FIG. 8) can be separated by simple distribution between chloroform and water into the more lipophilic ferrioxamine $D_1$, crystallizing in the form of long red prisms from a mixture of methanol and ether, and into ferrioxamine $D_2$, which is only formed in very small quantities. Ferrioxamine $D_1$ is readily soluble in water, methanol, alcohol, glacial acetic acid, methyl cellosolve and chloroform, sparingly soluble in ether, acetone, ethyl acetate, pyridine and dimethylformamide. It crystallizes from a mixture of methanol and ether in red needles. After being crystallized three times it melts at 194–200° C. $R_f$ in solvent system I: 0.73, $R_f$ in solvent system V: 0.72 (Table I). Partition coefficient in system VI: 1.80 (Table I). Electrophoresis see FIG. 5. Microanalysis: C, 49.06%; H, 7.50%; N, 12.56%; Cl, 0%; Fe, 8.45%. Titration: no acid or basic functions detectable. Ultraviolet spectrum in water: λ max 430 mμ

$$E^{1\%}_{1\,cm.} = 44$$

Infrared spectrum in potassium bromide shows inter alia bands at 2.95μ (s.), 3.06μ (s.), 3.25μ (w.), 3.43μ (s.), 6.08μ (s.), 6.35μ (s.), 6.86μ (s.), 7.30μ (m.), 7.94μ (m.), 8.20μ (w), 8.49μ (w.), 8.83μ (w.), 9.00μ (w.), 9.65μ (w.), 10.00μ (w.), 10.31μ (w.), 10.67μ (w.), 12.20μ (w.), 13.30μ (m), see FIG. 13. Ferrioxamine $D_1$ gives no color reaction with ninhydrin. The iron bound in ferrioxamine $D_1$ is removed from the complex when subjected to the action of a mineral acid or of strong alkali. Iron free ferrioximine $D_1$ is colorless. It can be transformed back to ferrioxamine $D_1$ with ferric chloride. It reacts also with other metal ions with formation of the corresponding metal complexes, for example the greenish colored copper-complex. Ferrioxamine $D_2$: Infrared spectrum in potassium bromide shows inter alia bands at: 2.95μ (s.), 3.43μ (m.), 6.08μ (s.), 6.36μ (s.), 6.90μ (s.), 8.49μ (w.), 8.87μ (w.), 9.65μ (w.), 10.05μ (w.), 10.70μ (w.), 13.22μ (w.), see FIG. 16. $R_f$ in solvent system I: 0.64, $R_f$ in solvent system V: 0.48 (Table I). Paper electrophoresis see FIG. 5. Ferrioxamine E which has more differentiated infrared spectrum than the other ferrioxamines (see FIG. 14) also differs from them by its poor solubility in water and methanol. Microanalysis: C, 49.80%; H, 7.37%; N, 12.48%; Cl, 0%; Fe, 8.14%. Titration: no acid or basic functions detectable.

Ultraviolet spectrum in water: λ max 430 mμ

$$(E^{1\%}_{1\,cm.} = 42)$$

The infrared spectrum in potassium bromide shows inter alia bands at 2.92μ (s.), 3.02μ (s.), 3.45μ (s.), 5.96μ (s.), 6.15μ (s.), 6.36μ (s.), 6.90μ (s.), 7.10μ (m.), 7.15μ (m.), 7.39μ (m.), 7.82μ (w.), 7.98μ (m.), 8.45μ (w.), 8.54μ (w.), 8.85μ (w.), 9.01μ (w.), 9.20μ (w.), 9.98μ (m.), 10.07μ (w.), 10.23μ (w), 10.43μ (w.), 10.71μ (w.), 11.87μ (w.), 13.20μ (m.), 13.66μ (w.), (see FIG. 14).

Ferrioxamine E gives no color reaction with ninhydrin. The iron bound in ferrioxamine E is removed from the complex when subjected to the action of a mineral acid or of strong alkali. Iron free ferrioxamine E is colorless. It can be transformed back to ferrioxamine E with ferric chloride. It reacts also with other metal ion with formation of the corresponding metal complexes, for example the greenish colored copper-complex. Ferrioxamine F, which according to its behavior in paper-chromatography and in counter-current distribution also belongs to the lipophilic group ($D_1$, $D_2$, E) shows however in contrast to $D_1$, $D_2$ and E, basic properties and is isolated as hydrochloride (cf. FIG. 4 and FIG. 5). Ferrioxamine F hydrochloride is readily soluble in water, methanol, pyridine, glacial acetainc acid, ethanol, dimethylformamide; sparingly soluble in chloroform, insoluble in ethyl acetate, acetone and ether. Microanalysis: C, 50.44%; H, 7.29%; N, 10.53%; Cl, 4.10%; Fe, 5.57%. $R_f$ in solvent system V: 0.80 (Table I). Partition coefficient in system VI: 3.12. (Table I). Electrophoresis see FIG. 5. Titration: $pK_{MCS}$ 9.75, equivalent weight 695. The infrared absorption spectrum in potassium bromide shows inter alia bands at 2.95μ (s.), 3.45μ (m.), 6.10μ (s.), 6.37μ (s.), 6.92μ (m.), 7.40μ (w.), 7.97μ (w.), 8.50μ (w.), 8.88μ (w.), 9.72μ (w), 10.10μ (w.), 10.70μ (w.), 13.75μ (w.) (see FIG. 15). Ultraviolet absorption in $H_2O$: λ max 430 mμ.

$$E_{1\,cm.}^{1\%} = 34$$

Ferrioxamine F gives a positive color reaction with ninhydrin. The iron bound in ferrioxamine F is removed from the complex when subjected to the action of a mineral acid or of strong alkali. Iron free ferrioxamine F is colorless. It can be transformed back to ferrioxamine F with ferric chloride. It reacts also with other metal ions with formation of the corresponding metal complexes, for example the greenish colored copper-complex.

In Table I below further characteristic physical data of the ferrioxamines which have hitherto been isolated are shown by way of comparison.

TABLE I

| Ferri-oxamine | Paper electro-phoresis[a] | Paper chromatography | | Counter-current distribution, K VI[d] | Extinction at 430 mμ $E_{1\,cm.}^{1\%}$ | Titration | |
|---|---|---|---|---|---|---|---|
| | | $R_fI$[b] | $R_fV$[c] | | | $pK_{MCS}$[e] | Equivalent weight |
| A | 13.6 | 0.35 | 0.21 | 0.11 | 37 | 9.89 | 634 |
| B | 13.0 | 0.44 | 0.29 | 0.23 | 39 | 9.74 | 704 |
| C | 12.3 | 0.54 | 0.37 | 0.49 | 39 | 8.88 | 762 |
| $D_1$ | 3.9 | 0.73 | 0.72 | 1.80 | 44 | (f) | |
| $D_2$ | 3.9 | 0.64 | 0.48 | | | (f) | |
| E | 3.9 | 0.68 | 0.59 | 1.59 | 42 | (f) | |
| F | 12.5 | | 0.80 | 3.12 | 34 | 9.75 | 695 |

[a] Cm. path in 0.33 N acetic acid after 4½ hours at 220 v. In comparison fructose travels 3.9 cm.
[b] $R_fI = R_f$-value in system I: n-butanol-glacial acetic acid-water (4:1:5).
[c] $R_fV = R_f$-value in system V: tertiary butanol-water-saturated aqueous sodium chloride solution-0.1 N HCl (50:25:25:1), paper impregnated with acetone-water-saturated aqueous sodium chloride solution (6:3:1).
[d] K VI = partition coefficient in system VI: n-butanol-benzyl alcohol-water-saturated aqueous sodium chloride solution-0.1 N HCl (200:100:300:60:3). Distribution of 10 mg. over 34 stages each of 3 cm. organic and 3 cm. aqueous phase at 23–25° C. Evaluation by measuring the extinction at 425 mμ (2 cm. of the fractions diluted with alcohol to 10 cm.).
[e] W. Simon et al., Helv. 37, 1872 (1954).
[f] Neutral.

In Table 2 are shown comparative chemical and physical data for ferrioxamine B and related growth-promoting substances as well as for a few sideramycin antibiotics, such as grisein A, albomycin and ferrimycin A.

The salts of the basic ferrioxamines A, B, C and F are derived from the known inorganic and organic acids, for example from hydrochloric acid, sulfuric acids, nitric acid and phosphoric acids, thiocyanic acid, acetic acid, propionic acid, valeric acid, glycollic acid, lacic acid, pyroracemic acid, malonic acid, palmitic acid, oleic acid, succinic acid, citric acid, tartaric acid, mandelic acid, glutmic acid, pantothenic acid, maleic acid, fumaric acid, benzoic acid, cinnamic acid, salicylic acid, para-minosalicylic acid, 2-phenoxy benzoic acid, 2-acetoxybenzoic acid, methane sulfonic acid, ethane sulfonic acid, methionine, tryptophane, lysine or arginine. They are neutral or acid salts. They are prepared by double conversion of salts, for example of ferrioxamine sulfate with calcium pantothenate, or by anion exchange on anion exchangers, for example of ferrioxamine chloride on a strongly basic exchanger, e.g. Amberlite IRA 400 in the sulfate form.

TABLE 2

| Substance | Analytical Values[4] | | | | | Molecular Weight | $pK^*_{MSC}$[d] | $λ_{max.}$ | $E_{1\,cm.}^{1\%}$ | Identified hydrolysis products | (e) |
|---|---|---|---|---|---|---|---|---|---|---|---|
| | C | H | N | Cl | Fe | | | | Absorption | | |
| Ferrimycin A[1] | 48.65 | 7.09 | 12.95 | 6.10 | 4.56 | [a] 1,106 | 4.18; 7.88 | 228, 319, 425 | 282, 28.2, 22.6 | $NH_3$, succinic acid, 1-ammo-5-hydroxylamino-pentane, 5-aminovaleric acid, cadeverine, cryst. substance with $λ_{max.}$ 227 and 323 mμ, pyroline and unidentified ninhydrin-positive substances. | [0.83] |
| Grisein A[2] | 43.95 | 5.65 | 12.97 | | 5.14 | [a] 1,034 | | 265, 420 | 108, 28.9 | Methyluraeil, glutamic acid | |
| Albomycin[3] | | | | | 4.16 | [c] 1,270–1,346 | | | | Methyluracil, serine, ornithine | |
| Ferrioxamine B hydrochloride.[6] | 48.04 | 7.41 | 11.21 | 5.25 | 7.67 | [a] 704 | 9.74 | 430 | 39.0 | $NH_3$, succinic acid, 1-amino-5-hydroxylamino-pentane, cadaverine, 5-aminovaleric acid, hydroxylamine no glycine, ornithine or serine. | [1.2] |
| Ferrichrome[4] | 44.02 | 5.90 | 16.55 | | 7.35 | [c] 725 | | 425 | 39.4 | $NH_3$, glycine, ornithine | 2.89 |
| Ferrichrome A[4] | 44.75 | 5.80 | 11.18 | | 5.3 | [c] 1,100 | | 440 | 33.8 | Serine, glycine, ornithine | 3.01 |
| Coprogen[5] | 50.96 | 6.83 | 10.26 | | 6.61 | | | 440 | 36.6 | | |

[a] By titration.
[b] According Fe-, $SO_4$- and $NH_2$-content.
[c] Found by two different methods.
[d] W. Simon, E. Kovats, L. H. Chopard-dit-Jean and E. Heilbronner, Helv. 37, 1872 [1954].
[e] "Hydroxylamine-values" per atom Fe found colorimetrically (according to Csaky 6); bracketed values are uncorrected.

[1] U.S. patent application Ser. No. 32,294 filed May 27, 1960 by us.
[2] F. A. Kuehl et al., J. Amer. Chem. Soc. 73, 1770 (1951).
[3] G. F. Gause, Brit. Med. J. 1955, 1177.
[4] J. B. Neilands, Bact. Rev. 21, 101 (1957).
[5] C. W. Hesseltine et al., J. Amer. Chem. Soc. 74 1362 (1952).
[6] T. Z. Csaky, Acta Chem. Scand. 2, 450 (1948).

The ferrioxamines promote the growth of a large number of organisms. For instance, they have such an effect on *Bacillus subtilis, Micrococcus pyogenes* var. *aureus, Saccharomyces cerevisiae, Ustilago sphaerogena* and *Chlamydomonas eugametos*. In Table 3 there are summarized as examples the results of tests with *Ustilago sphaerogena* (smut fungus) and with *Chlamydomonas eugametos* (Chlorophyceae) for which an enriched preparation of ferrioxamine B was used.

TABLE 3.—RELATIVE GROWTH COMPARED WITH AN UNTREATED CONTROL SPECIMEN

| | Ferrioxamine B addition (μg./cc.) | | | | | |
|---|---|---|---|---|---|---|
| | 0 | 100 | 10 | 1 | 0.1 | 0.01 | 0.001 |
| *Ustilago sphaerogena* (24 hours culture), percent | 100 | | 540 | 405 | 247 | 158 | 111 |
| *Chlamydomonas eugametos* (4 days culture), percent | 100 | 280 | 271 | 137 | 98 | 98 | |

Other organisms—for example representatives of the genus Arthrobaeter, such as *Arthrobacter terregens* and *Arthrobacter flavescens*—can develop at all only in the presence of ferrioxamines; that is to say that in these cases the ferrioxamines have a vitamin-character similar to that observed for the growth factors ferrichrome, terregens factor and coprogen (Bact. Rev. 21, page 101 [1957]).

It is another biological property of the ferrioxamines that they are capable of counteracting competitively the antibacterial action of antibiotics belonging to the group of the sideramycins towards gram-positive organisms.

The antisideramycin action of the ferrioxamines is shown by the antibiotics albomycin, grisein, A 1787, ferrimycin and A 22765, all of which also display a cross-resistance with grisein. It is surprising that the ferrioxamines counteract the action of the grisein-like sideramycins towards gram-positive bacteria but not towards gram-negative bacteria.

The antogonism between the ferrioxamines and the sideramycins, which is called "antisideramycin activity," can be observed both in vitro and in vivo. The antagonising action of ferrioxamine B on the antibacterial activity of various antibiotics is shown in the following table. The test organisms used were *Escherichia coli, Bacillus subtilis* and *Staphylococcus aureus*. The antibiotics were tested in the modified test according to Bonifas towards ferrioxamine B (1 mg. per cc.), which is described below.

TABLE 4

| | Antagonism of ferrioxamine B on antibiotic activity against— | | |
|---|---|---|---|
| Antibiotic | *Bacillus subtilis* | *Staphylococcus aureus* | *Escherichia coli* |
| Ferrimycin | Competitive | Competitive | φ.⁵ |
| Grisein (40,000 U/mg.) | do | do | Nil. |
| Albomycin | do | do | Nil. |
| A 1787 | do | do | Nil. |
| A 22765 ² | do | do | φ. |
| Neomycin | Nil | Nil | Nil. |
| Streptomycin | Nil | Nil | Nil. |
| Streptothricin | Nil | Nil | Nil. |
| Viomycin | Nil | Nil | Nil. |
| Penicillin | Nil | Nil | φ. |

¹ Signifies that the antibiotic so marked is practically inactive toward this test organism.
² Strain *S. aureofaciens* Duggar A 22765.

Further antibiotics not affected by ferrioxamines, not shown in the above table are: Actomycin, the actinomycins C, X, I and Z, angolamycin, carbomycin, chartreusin, chlorotetracycline, cycloserin, the cinerubines, desertomycin, erythromycin, exfoliatin, granaticin, holomycin, leucomycin, megacidin, methymycin, narbomycin, novobiocin, oleandomycin, oxytetracycline, picromycin, rhodomycin, the spiramycines, streptogramin, the tetriomycines and thiolutin.

The antisideramycin activity in vitro of the ferrioxamines facilitates a qualitative indentification and quantitative determination of the ferrioxamines, since the test developed by Bonifas (V. Bonifas, Experientia 8, page 234 [1952]) specifically for the determination of synergistically active substances can be suitably applied. For this purpose plates, e.g. petri dishes containing a layer of of suitable agar medium are inoculated with *Bacillus subtilis* Cohn emned. Prazmowski or *Staphylococcus aureus* Rosenback are prepared. Strips of filter paper, for instance of Whatman paper No. 1 (5 mm. wide) impregnated with a solution of a sideramycin antibiotic, for example 10 γ/cc. ferrimycin in methanol are placed on these agar layers. At right angles other strips, likewise of 5 mm. width, saturated with the solution whose content of ferrioxamine is to be tested are placed on the sideramycin containing strips. After incubation for 9–15 hours at 36° C. the influence of the ferrioxamines on the antibiotic activity of ferrimycin is easy to recognise: In the inhibition aureole which forms from the strips saturated with the antibiotic there is formed, at the crossing of the two strips, a wedge-shaped constriction, the form and dimensions of which under standard conditions are used for the quantitative determination of the ferrioxamine concerned (see FIG. 10).

If a solution contains both ferrimycin and ferrioxamine, it must be heated to 60° C. for 30 minutes at neutral pH. By this procedure the antibiotic activity of the ferrimycin is destroyed, while the ferrioxamine remains unaffected and can consequently be determined quantitatively.

In this antisideromycin test ferrioxamine B is the most effective of all the ferrioxamines. With *Staphylococcus aureous* as test organisms the other ferrioxamines show the following activities in relation to B: A, 51%; C, 16%; $D_1$, 8%; $D_2$ 3%; E, 4% and F, 30%.

The aforementioned substances ferrichrome, terregens factor and coprogen resemble the ferrioxamines in their vitamin-character with respect to *Arthrobacter terregens* and *Arthrobacter flavescens*. On the other hand the aforementioned typical growth-promoting effect of the ferrioxamines on *Bacillus subtilis, Micrococcus pyogenes, Saccharomyces cerevisiae, Ustilago sphaerogena* and *Chlamydomonas eugametos* has not been observed with the three substances ferrichrome, terregens factor and coprogen. Furthermore nothing is known about an antagonistic effect of these substances on the antibacterial activity of the sideramycin antibiotics, which is typical for the ferrioxamines.

In paper chromatography ferrichrome differs distinctly in direct comparison in the system V (cf. Table I) from the ferrioxamines B–F, but shows in this system a similar $R_f$-value to ferrioxamine A. On the other hand, as neutral substance it is easily distinguished from the strongly basic ferrioxamine A in paper-electrophoresis in 0.33 N-acetic acid. The terregens factor contains only traces of iron and is consequently different from all the ferrioxamines. Coprogen can be easily distinguished from the ferrioxamines A, B, D and E by means of its analytical data. The ratio percent C/percent N is in the case of coprogen 4.97, in the case of the ferrioxamines 3.5–4.3. In the case of ferrioxamines C and F this difference is not so pronounced (percent C/percent N=4.74–4.78). Ferrioxamines C and F are strong bases which are isolated as hydrochlorides, whereas coprogen, according to the present date, is a neutral substance (Journ. Amer. Chem. Soc. 74, 1362 (1952)).

The ferrioxamines, their derivatives and fission products and the salts of these compounds are obtained by isolating the new growth-promoting substances from plant organisms or extracts thereof by methods known per se taking the above chemical and physical data into consideration and using the antisideramycin test and, if desired, the salts, derivatives or fission products of the new compounds are prepared.

Starting materials suitable for the preparation of the ferrioxamines are for example: Organs of higher plants such as dicotyledoneae, e.g. Solanaceae, for instance *Solanum lycopersicum* L. or Umbelliferae, for instance *Daucus carota* L., and Monocotyledoneae, e.g. Commelinaceae for instance Rhoeo discolor (L. Hér.) Hance, cultures of algae, for example of *Chlamydomonas eugametos*, or above all cultures of microorganisms, for example of representatives of the genus Streptomyces, of bacteria for example of *B. subtilis* or of yeasts, for example of *Saccharomyces cerevisiae*. The antisideramycin activity can be observed by way of the aforementioned test either in the crude extract or in the culture filtrate.

An especially preferred source are cultures of strains of Streptomycetes which according to the characteristics proposed by Ettlinger et al. (Arch. Mikrobiol, 3, page 326 [1958]) belong to the following species: *Streptomyces griseoflavus* (Krainsky) Waksman et Henrici, *Streptomyces lavendulae* (Waksman et Curtis) Waksman et Henrici, *Streptomyces galilaeus* Ettlinger et al., *Streptomyces pilosus* Ettlinger et al., *Streptomyces polychromogenes* Hagemann, Penasse et Teillon, *Streptomyces viridochromogenes* (Krainsky) Waksman et Henrici, *Streptomyces aureofaciens* Duggar, *Streptomyces olivaceus* (Waksman) Waksman et Henrici, *Streptomyces griseus* (Krainsky) Waksman et Henrici, *Streptomyces glaucescens* Gause et al.

The following table lists the specific features characterising the Streptomycetes strains capable of producing ferrioxamines.

yeasts, seeds, more especially of the rape and soybean plants, cotton seeds and the like, also ammonium salts and nitrates. Inorganic salts present in the nutrient solution may be, for example, chlorides, carbonates, sulfates of alkali metals, alkaline earth metals, magnesium, iron, zinc or manganese.

The microorganisms are grown under aerobic conditions, for example in a static surface culture or preferably submerged with shaking or stirring with air or oxygen in shaking flasks or in the known fermenters. If Streptomyces strains are used the cultivation temperatures range from 18 to 40° C. Under these conditions the nutrient solution develops a substantial ferrioxamine activity in general within 2 to 10 days. 0.1% of ferric chloride is then added to the culture and the mycelium is separated from the culture filtrate, whereupon the bulk of the ferrioxamines is found in the culture filtrate. Substantial amounts of ferrioxamines, however, still remain adsorbed on the mycelium so that the latter is advantageously thoroughly washed, for instance with water and/or an aqueous organic solvent, such as an alcohol, for example aqueous methanol.

In a similar manner also bacteria, for example *B. sub-*

TABLE 5

| Characteristics Species | Morphology of spores | Color of air mycelium | Morphology of air mycelium | Melanoid pigment |
|---|---|---|---|---|
| *S. griseoflavus* (Krainsky) Waksman et Henrici. | Spores with short spikes. | Ash grey | Spore chains with open, regular spirals, often over 6 coils. | Absent. |
| *S. pilosus* Ettlinger et al. | Spores with fine brittle hairs. | do | do | Present. |
| *S. viridochromogenes* (Krainsky) Waksman et Henrici. | Spores with short spikes. | Pale blue | do | Do. |
| *S. olivaceus* (Waksman) Waksman et Henrici. | Smooth | Ash grey | Spore chains monopodially branched, straight or wavy. | Absent. |
| *S. aureofaciens* Duggar | do | do | Spore chains monopodially branched, with irregular, open spirals. | Do. |
| *S. galilaeus* Ettlinger et al | do | do | Spore chains monopodially branched, long straight main axis, open regular spirals, generally more than 6 coils. | Present. |
| *S. lavendulae* (Waksman et Curtis) Waksman et Henrici. | do | Pale carmine to cinnamon brown. | Spore chains with open irregular spirals at the ends of long straight pieces. | Do. |
| *S. polychromogenes* Hagemann et al | do | Pale carmine to cinnamon. | Spore chains straight or wavy. | Do. |
| *S. griseus* Waksman et Henrici | do | Yellowish to greenish grey. | Spore chains wavy, sympodially branched, bunches without spirals. | Do. |

Substantial amounts of the ferrioxamines are advantageously prepared from cultures of the aforementioned micro-organisms. Particularly good results have been obtained in this connection with the aforementioned streptomyces strains which are easy to grow on a large scale. The present invention is however, not restricted to the use of representatives of the aforementioned species but it includes also the use of strains of other species capable of producing the ferrioxamines and more especially of variants of all these organisms such as are obtained, for example, by selection or mutation, more especially with irradiation with ultra-violet or X-rays or under the action of nitrogen mustard oils.

To prepare a substantial amount of the ferrioxamines for example, a strain possessing the properties of the aforementioned Streptomycetes is grown under aerobic conditions, for example in an aqueous nutrient solution containing carbohydrates, nitrogenous compounds and inorganic salts until the solution displays a substantial ferrioxamine action, whereupon the ferrioxamines are isolated. Alternatively, plants can be grown such as Chlorophyceae, or bacteria such, for example, as *B subtilis*, and from these the ferrioxamines are isolated in pure or enriched form. Assimilable carbohydrates suitable for growing the aforementioned microorganisms are for example glucose, saccharose, lactose, mannitol, starches or glycerol. Suitable nitrogenous nutrients and if desired growth-promoting substances are: amino acids, peptides and proteins and breakdown products thereof such as peptone or tryptone, also meat extracts, water-soluble constituents of cereal grains, such as maize and wheat, of distillation residues of the manufacture of alcohol, of

*tilis*, can be grown and the culture filtrates used as source for the isolation of the ferrioxamines.

The ferrioxamines can be isolated from the aforementioned materials, more especially from the culture filtrates of fungus or bacterium cultures, by such known methods for example as one of the methods mentioned below or by a combination of two or more of such methods:

(1) An adsorbent can be used, for example an active carbon such as Norit, an activated earth, such as Frankonit, fuller's earth or floridine or an adsorber resin such as Asmit. The adsorbates are advantageously eluted with a mixture of water with a water-miscible organic solvent, for example with a mixture of water+methanol, water+pyridine, dilute acetic acid+methanol, or a mixture of water+methanol+glacial acetic acid+butanol. In eluting a Frankonit or Norit adsorbate particularly good results have been achieved with a mixture of 4 parts by volume of water and 1 part by volume of pyridine.

(2) According to another method of isolation the ferrioxamines are adsorbed on a cation exchanger and for this purpose a resin containing acid groups, such as Dowex-50, is especially suitable. This resin can be used either in the acid form or in the sodium form, through mixtures of these two forms have proved particularly useful. The elution is advantageously carried out with an acid agent, for example with methanolic hydrochloric acid or an acidic buffer solution.

(3) Furthermore, the ferrioxamines can be extracted from an aqueous solution thereof by means of an organic solvent. Higher organic alcohols, for example benzyl alcohol or isopropanol, have proved particularly advantageously for this extraction process. It is of advantage in this connection to add to the aqueous phase an inorganic salt, for example ammonium sulfate or sodium chloride. From the resulting organic extracts the ferrioxamines can be obtained in an enriched form either by evaporating the solvent or by precipitating the product with a suitable organic solvent, for example ether, petroleum ether of ethyl acetate.

(4) The ferrioxamines can also be enriched by treating a concentrated aqueous or alcoholic-aqueous solution of the salt with an excess of an organic water-miscible solvent such as acetone, dioxane or the like, whereby the salts are precipitated in solid form.

(5) Another method of enriching the ferrioxamines consists in distributing them between an aqueous solution and a solution of phenol in chloroform, both the pH-value of the aqueous solution and the phenol content of the chloroform solution being varied. Taking as the coefficient of distribution of the ferrioxamines the ratio of their concentration in the organic phase to their concentration in the aqueous phase, it will be realized that the coefficient of distribution rises as the phenol content of the organic phase is increased, and is reduced as the pH of the aqueous phase is lowered. Since it is thus possible to establish any desired coefficient of distribution of the ferrioxamines in this system, a combination of a few distribution operations enables a large portion of inactive impurities to be removed.

(6) Another method of enriching the ferrioxamines is chromatography, such as adsorption chromatography on various materials, for example on Norit, alumina, magnesium silicates, silica gel or calcium sulfate, as well as partition chromatography using cellulose, starches, silica gel, Celite or the like as carrier substances, or chromatography on ion-exchanger resins such as Dowex-50, Amberlite IRC-50 and the like.

(7) Furthermore, the ferrioxamines can be enriched by counter-current distribution according to Craig between two immiscible solvent phases. For this purpose the following solvent systems have proved particularly advantageous:

(a) Benzyl alcohol, aqueous ammonium sulfate solution of 20% strength.

(b) 100 parts by volume of n-butanol, 200 parts by volume of benzyl alcohol, 6 parts by volume of N-hydrochloric acid, 300 parts by volume of water, 60 parts by volume of aqueous sodium chloride solution saturated at 19° C.

(8) Finally, the purification, enrichment and separation of ferrioxamines preparations can be performed by preparative electrophoresis on a column of carrier material. This process is advantageously carried out as a high-voltage electrophoresis at 500–4000 volts. A further improvement can be obtained by carrying out the electrophoresis according to the so-called counter-current principle, in which the basic ferrioxamines A, B, C and F, which are present as cations are locally anchored on the carrier column by accurately compensating their movement produced by the electric field with a current of electrolyte flowing in the opposite direction. In this way it is ensured that substances having a different electric mobility leave the carrier column at the ends of the two electrodes.

The individual ferrioxamines are obtained as pure and uniform substances in the form of amorphous powders or as crystals. For their preparation the following methods have proved to be useful:

Lyophilization of an aqueous or alcoholic solution;

Precipitation from an aqueous, alcoholic or phenolic solution with lipophilic organic solvents which are miscible with the solvent containing the ferrioxamine in question. Particularly suitable for this precipitation are lower alkyl ketones, such as acetone, methylethyl ketone, ethers, such as diethyl ether, diisobutylether, and hydrocarbon such as pentane, hexane, petroleum ether;

Crystallization from suitable solvent mixtures, such as alcohol-ether mixture, like methanol-diethylether, or mixtures of water and organic solvents at least partially miscible with water, like water-acetone, water-glacial acetic acid and so on.

The ferrioxamines as well as their derivatives and their salts can be used for promoting the growth of various organisms, for which purpose they are used as such or in the form of special preparations containing the aforementioned compounds in admixture with a suitable vehicle.

They also possess marked anti-anaemic properties, which were demonstrated in the case of ferrioxamine B as follows in experimental animals:

(1) ANTI-ANAEMIC EFFECTS

In the normal rabbit, 10 mg./kg. s.c. daily for 5 days, corresponding to approximately 0.8 mg./kg. Fe . . ., produced no significant alterations in the haemoglobin level, in the erythrocyte and reticulocyte counts, or in the haematocrit. On the other hand, from the 3rd day onwards, a certain increase in the sedimentation rate as measured according to Westergren was observed, the figure rising from 20 mm. in 24 hours to approx. 30 mm., then on the 5th day to 40 mm., reverting to normal again from the 6th day onwards. This increase in the sedimentation rate was accompanied by a rise in the total serum proteins as measured electrophoretically, this rise affecting particularly the $\alpha$ and $\gamma$ globulins; the total serum protein levels subsequently returned to normal parallel with the normalisation of the sedimentation rate.

(a) Haemorrhagic anaemia.—By contrast, in a group of 5 rabbits following haemorrhage involving a loss of blood equivalent to 2% of their body-weight, a considerable decrease in haemoglobin (down to approx. 7 g./100 ml.) was noted on the next day, followed by relatively slow restitution and virtual normalisation after 24 days. Parallel with this, a crisis affecting the reticulocytes was observed, which reached its maximum of 6% around the 9th day and was followed by more or less complete normalisation after 24 days. Under the same experimental conditions, a similar group of 5 rabbits which had received ferrioxamine B in daily doses of 10 mg./kg. s.c. for 24 days, starting from the day after the haemorrhage, showed a much more rapid rise in haemoglobin, the level of which became roughly normal again by the 18th day; in the animals thus treated, the crisis involving the reticulocytes also subsided on the 3rd day. The results obtained in these experiments are listed in Table 6.

TABLE 6

| Days | Haemoglobin | | Reticulocytes | |
|---|---|---|---|---|
| | Controls | Ferrioxamine B, 10 mg./kg. s.c. | Controls | Ferrioxamine B, 10 mg./kg. s.c. |
| 0 Haemorrhage [1] | 12 | 12 | 22 | 22 |
| 1 | 7.2 | 8.0 | 37 | 37 |
| 3 | 8.2 | 8.8 | 44 | 48 |
| 6 | 8.7 | 9.1 | 58 | 42 |
| 9 | 8.7 | 9.0 | 62 | 37 |
| 12 | 9.1 | 10.0 | 56 | 29 |
| 15 | 9.3 | 10.3 | 43 | 25 |
| 18 | 10.6 | 12 | 34 | 25 |
| 21 | 10.8 | 12.5 | 30 | 23 |
| 24 | 12.2 | 12.8 | 27 | 21 |

[1] 2% of the animal's body-weight.

In another series of tests, a more severe haemorrhage was produced by first removing blood equivalent to 2% of the animal's weight and then, 3 days later, removing the equivalent of a further 1%. Under these conditions, a group of 5 rabbits showed a fall in haemoglobin to 7.5–8 g./100 ml., which reached its maximum 1 day after the second haemorrhage, persisted until about the 9th day, and reverted roughly to normal on the 27th day. At the same time, a reticulocyte crisis was noted, which gradually reached its maximum by the 9th day (reticulocytes 6.9%) and then slowly subsided until at the end of the test the reticulocyte count had reverted to normal. A parallel group of 5 comparable rabbits, having received ferrioxamine B in daily doses of 10 mg./kg. s.c. for 27 days, showed a much less pronounced fall in haemoglobin and a much more rapid recovery. At the same time, the reticulocyte crisis attained a maximum of barely 4% between the 3rd and 6th day, normalisation supervening towards the 18th day. These results are listed in Table 7.

TABLE 7

| Days | Haemoglobin, g./100 ml. | | Reticulocytes, percent | |
|---|---|---|---|---|
| | Controls | Ferrioxamine B, 10 mg./kg. s.c. | Controls | Ferrioxamine B, 10 mg./kg. s.c. |
| 0 Haemorrhage [1] | 12.4 | 12.2 | 2.3 | 2.1 |
| 1 | 8.7 | 8.6 | 2.9 | 3.3 |
| 3 Haemorrhage [2] | 8.4 | 9.3 | 4.3 | 3.9 |
| 4 | 7.5 | 8.9 | 5.2 | 3.9 |
| 6 | 8.0 | 8.9 | 6.0 | 3.5 |
| 9 | 8.5 | 9.5 | 6.9 | 3.1 |
| 12 | 9.4 | 10 | 5.9 | 2.9 |
| 15 | 9.2 | 10.6 | 4.8 | 2.6 |
| 18 | 10.7 | 11 | 4.5 | 2.1 |
| 21 | 11.2 | 11 | 3.6 | 2 |
| 24 | 12 | 12 | 3 | 2 |
| 27 | 12.2 | 12.5 | 2.5 | 2 |

[1] 2% of the animal's body-weight.
[2] 1% of the animal's body-weight.

It follows from these experiments that, in daily doses of 10 mg./kg. s.c., ferrioxamine B exerts a specific anti-anaemic effect in experimentally induced haemorrhagic anaemia, as the result of which the haemoglobin level reverts more rapidly to normal and the reticulocyte crisis is considerably attenuated.

(b) Iron-deficiency anaemia in rats.—A group of 10 to 15 young rats weighing approx. 40 g. and receiving a diet consisting exclusively of cow's milk and semolina, according to the method of D. L. Drabkin and H. K. Miller (J. Biol. Chem. 93, 39, 1931) and E. Rothlin and E. Undritz (Helv. med. Acta, Series A, 460, 1946), developed—in addition to slightly retarded growth—an iron-deficiency anaemia with a fall in haemoglobin to approx. 7 g./100 ml., accompanied by no significant change in the erythrocyte count but by a decrease in the haemoglobin erythrocyte index reaching its maximum after 30–60 days. The reticulocyte crisis attained its maximum after 60 days. Parallel groups of animals which received ferrioxamine B in daily doses of 10 mg./kg. s.c. or p.o. starting from the 60th day showed a considerable rise in haemoglobin, the level of which reverted almost to normal after 70–80 days; there was little effect on the erythrocyte count, but the haemoglobin index approached normal figures, and the reticulocyte crisis was less marked than in the controls. The results obtained in these experiments are listed in Table 8.

These results show that, in daily doses of 10 mg./kg. s.c. and p.o., ferrioxamine B was able to exert a specific influence on this form of iron-deficiency anaemia, rectifying the haemoglobin level, normalising the erythrocyte index, and attenuating the reticulocyte crisis.

(c) Bartonella muris anaemia in rats.—In adult rats suffering from latent infection with Bartonella muris, splenectomy—performed according to the method of J. Marmorston-Gottesman and D. Perla (J. Exp. Med. 52, 121, 131, 1930) and D. Weinmann (J. Infect. Dis. 63, 1, 1938)—led to acute anaemia which often proved fatal. This anaemia was characterised by a considerable diminution in the erythrocyte count, a fall in the haemoglobin level, and an intense reticulocyte crisis of approx. 10%, these manifestations attaining their maximum degree roughly 6 days after splenectomy. Similar groups of 10 rats which had received ferrioxamine B in daily doses of 10 mg./kg. s.c. or p.o. showed a decidedly smaller decrease in the erythrocyte count and in the haemoglobin level as well as a far less severe reticulocyte crises, which for example was even suppressed after 10 mg./kg. p.o. The results thus obtained are summarised in Table 9, showing that ferrioxamine B is also capable of exerting its specific anti-anaemic properties in this type of experimental anaemia.

TABLE 9

| Days | Erythrocytes, millions/ml. | | | Haemoglobin, g./100 ml. | | | Reticulocytes | | |
|---|---|---|---|---|---|---|---|---|---|
| | Controls | Ferrioxamine B, 10 mg./kg. | | Controls | Ferrioxamine B, 10 mg./kg. | | Controls | Ferrioxamine B, 10 mg./kg. | |
| | | s.c. | p.o. | | s.c. | p.o. | | s.c. | p.o. |
| 0 [1] | 6.69 | 7.18 | 7.52 | 13.8 | 13.2 | 14.7 | 26 | 28 | 21 |
| 3 | 6.76 | 7.21 | 6.83 | 12.8 | 12.7 | 13.2 | 44 | 32 | 28 |
| 6 | 5.85 | 7.00 | 6.56 | 12.3 | 12.4 | 12.7 | 102 | 42 | 31 |
| 9 | 5.78 | 7.05 | 6.71 | 11.2 | 12.7 | 12.6 | 88 | 46 | 31 |
| 12 | 6.06 | 6.87 | 7.10 | 11.7 | 12.6 | 13.4 | 68 | 67 | 29 |

[1] Splenectomy.

(2) OTHER PHARMACOLOGICAL PROPERTIES

Ferrioxamine B has a meagre spectrum of pharmacological properties: given in doses of up to 100 mg./kg. i.v., it causes no fall in arterial blood pressure and has no influence on respiration in rabbits anaesthetized with urethane (1.4 g./kg. s.c.). On isolated organs, such as the rabbit or guinea-pig intestine, the seminal vesicle of the guinea-pig, and the vessels of the rabbit hindquarters, it is inactive in concentrations of up to 100 $\gamma$/ml., at which concentrations it also has no specific anticholinergic, musculotropic, adrenolytic, or histaminolytic effects on the appropriate isolated organs. As a "growth factor," ferrioxamine B promoted the proliferation of various micro-organisms, such as B. subtilis. Staphylococcus aureus, Candida vulgaris, Ustilago sphaerogena, and Chlamydomonas eugametos (H. Bickel, E. Gäumann, W. Keller-Schierlein. V. Prelog. E. Vischer, A. Wettstein, and H. Zähner: Experientia 16, 129, 1960), in concentrations of 0.1 $\gamma$/ml. and above. In concentrations ranging up to 100 $\gamma$/ml. it has no bacteriostatic effect in vitro on any of a whole series of gram-positive and gram-negative bacteria, nor did it display any activity against various fungi in concentrations up to the very high level of 100–1,000 $\gamma$/ml.; it also showed no chemotherapeutic effects in

TABLE 8

| Days | Haemoglobin, g./100 ml. | | Erythrocytes, millions/cu. mm. | | Index, $\mu\gamma$-Hb/ erythrocyte | | Reticulocytes, Percent | |
|---|---|---|---|---|---|---|---|---|
| 1 | 10.7 | 10.7 | 4.76 | 4.76 | 22.5 | 22.5 | 4.7 | 4.7 |
| 30 | 8.0 | 7.6 | 6.44 | 5.90 | 12.4 | 12.9 | 3.2 | 3.5 |
| 60 | 7.0 | 6.4 | 7.62 | 6.42 | 9.2 | 10.0 | 3.6 | 4.2 |
| | Controls | Ferrioxamine B, 10 mg./kg. daily p.o. | Controls | Ferrioxamine B, 10 mg./kg. daily p.o. | Controls | Ferrioxamine B, 10 mg./kg. daily p.o. | Controls | Ferrioxamine B, 10 mg./kg. daily p.o. |
| 67 | 6.8 | 8.9 | 6.72 | 7.12 | 10.1 | 12.5 | 4.4 | 4.2 |
| 74 | 6.8 | 10.1 | 7.23 | 7.08 | 9.4 | 14.3 | 4.7 | 4.1 |
| 81 | 7.0 | 11.3 | 6.85 | 6.88 | 10.2 | 16.4 | 4.5 | 3.6 |
| 88 | 7.0 | 11.8 | 6.84 | 7.13 | 10.2 | 16.5 | 4.3 | 3.0 | doses of up to 500 mg./kg. s.c. administered 5 times in 30 hours, affording no protection to groups of 10 mice suffering from a lethal *Staphylococcus aureus* or *Streptococcus haemolyticus* infection.

(3) TOXICOLOGY

The toxicity of ferrioxamine B is very low, the $LD_{50}$ (=amount required to kill 50% of the animals) for a single dose being 950 mg./kg. i.v. and 2,500 mg./kg. p.o. in mice and 500 mg./kg. s.c. in rats. In mice and rats, sublethal doses provoke signs of introxication in the form of ataxia and non-specific paralysis interrupted by mild convulsions.

In sub-acute toxicity tests, ferrioxamine B was administered to groups of 12 rats for 28 days in daily doses of 1,000 mg./kg. s.c. None of the animals died during the tests. The weight of the animals thus treated increased from 118 to 222 g. and that of the controls from 113 to 214 g.; hence, the rate of growth remained perfectly normal. At the same time, a regular check was kept on the red and white blood counts: no pathological changes in the blood such as might have been ascribed to the repeated administration of ferrioxamine B were found. At the end of the experiment, examination of the main organs, such as the heart, lungs, stomach, intestine, liver, kidneys, spleen, thymus, lymph nodes, thyroid, and testicles, sowed that there had been no alteration in weight and that no pathological lesions attributable to repeated treatment with ferrioxamine B had occurred.

The acute local tolerability of ferrioxamine B was good; not until a concentration of 30% was reached did slight transient hyperaemia develop when the product was instilled into the conjunctival sac of rabbits.

(4) SUMMARY AND CONCLUSION

Ferrioxamine B displays specific anti-anaemic properties and low toxicity in experimental animals; it may therefore be considered for medicamentous use in the treatment of anaemia in daily parenteral doses of 100 mg. or fractions of the latter.

Suitable vehicles for preparations are substances that do not react with the ferrioxamines such, for example, as gelatine, lactose, starches, magnesium stearate, talc, vegetable oils, benzyl alcohols, gums, polyalkylene, white petroleum jelly or cholesterol. Such preparations may be in solid form, for example powders, or, in liquid form, solutions, suspensions or emulsions. They may be sterilized and/or or may contain additives such as preserving, stabilizing, wetting agents or emulsifiers. They may further contain other therapeutically useful substances.

FIG. 1 shows a counter current distribution of crude ferrioxamine in the system n-butanol-benzyl alcohol-water-saturated aqueous sodium chloride solution-N-hydrochloric acid (100:200:300:60:6) over 80 stages each of 100 ccm. of organic phase and 1 ccm. of aqueous phase. . . . Extinction at 425 m$\mu$. Antisideromycin-activity in mm. (modified Bonifas-test).

FIG. 8 shows a chromatogram of fractions 2–5 obtained by chromatography of fraction V of FIG. 1 on Dowex 50–WX$_2$ using ammonium acetate buffer as eluting agent in both instances. . . . Extinction at 425 m$\mu$.

FIG. 9 shows a chromatogram of fraction 48–55 obtained by chromatography of fraction V of FIG. 1 on Dowex 50–WX$_2$ using ammonium acetate buffer as eluting agent in both cases. . . . Extinction at 425 m$\mu$.

Figure 1:
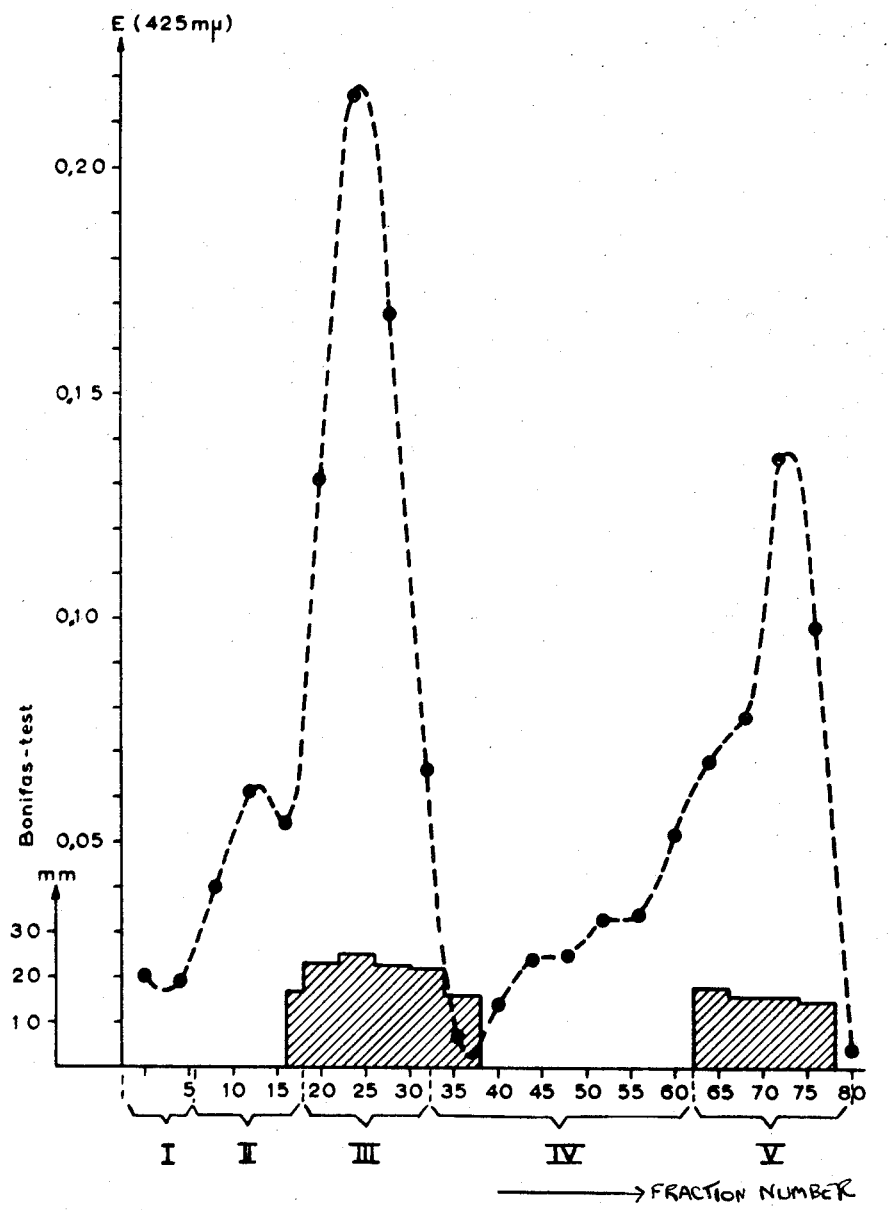

As already mentioned, from the ferrioxamines the iron can be eliminated, for instance by treating the red-colored solution containing a ferrioxamine, with a mineral acid or a strong alkali. There is obtained a colorless solution containing a desferri-ferrioxamine. By treatment of such colorless solution with ferric chloride the typical color of the ferroxamines returns.

Now it was found that the desferri-ferrioxamines are 7,18,29-trihydroxy-8,11,19,22,30-pentaoxo - 1,7,12,18,23,-29-hexaaza-triacontanes. Desferri-ferrioxamine B is the 30-methyl derivative, desferri-ferrioxamine G is the 30-($\beta$-carboxyethyl)-derivative, desferri-ferrioxamine $D_1$ the 1-acetyl-30-methyl-derivative of 7,18,29-trihydroxy-8,11,19-22,30 - pentaoxo - 1,7,12,18,23,29-hexaaza-triacontane and desferri-ferrioxamine E is the 33-membered, cyclic compound in which the carboxyl group at the end of 30-($\beta$-carboxyethyl)-7,18,29-trihydroxy-8,11,19,22,30-pentaoxo-1,7,12,18,23,29-hexaaza-triacontane is combined with the $N_1$-atom.

The present invention concerns trihydroxamic acids of the Formula I

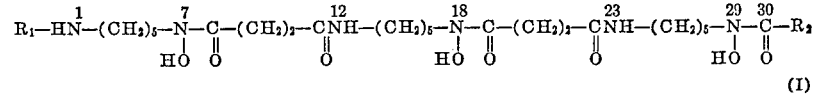

(I)

in which $R_1$ stands for hydrogen, a carboxylic acid acyl radical or an unsubstituted or substituted hydrocarbon radical, CO—$R_2$ represents an acyl radical or $R_1$ and CO—$R_2$ together stand for the radical of a dicarboxylic acid, especially succinic acid, of which the second carboxyl group is combined with the $N_1$-atom, the O-acyl derivatives, the salts and metal complexes of said compounds.

An acyl radical $R_1$ or CO—$R_2$ is for example an aliphatic acyl radical, preferably an alkanoyl or alkenoyl radical, e.g. the formyl, acetyl, propionyl, butyryl, valeryl, stearyl or oleyl radical, or a substituted alkanoyl radical, for example a free or esterified e.g. lower alkanoyl-esterified succinyl or glutaryl radical, are ethoxy-carbonyl or amino-carbonyl radical or an amino acid radical, preferably one of a natural $\alpha$-amino acid, e.g. the glycyl, alanyl, valyl or leucyl radical, also an aroyl or aralkanoyl radical, for example an unsubstituted or substituted benzoyl radical, e.g. the salicyl, p-hydroxy-benzoyl, dihydroxybenzoyl, p-aminosalicyl, p-methoxy-benzoyl, p-ethoxybenzoyl, p-ethoxy-ethoxy-benzoyl, p-ethoxy-polyethyleneoxy-benzoyl radical, a naphthoyl, a free or esterified phthaloyl, a carbobenzoxy or phenylacetyl radical. When $R_1$ stands for a hydrocarbon radical then it is preferably an aryl radical, especially the m-dinitro-phenyl radical.

The trihydroxamic acids of the Formula I are if $R_1$ is not an acyl radical, bases, which form salts with acids. For preparing such salts there come into consideration preferably therapeutically acceptable acids, either inorganic acids, for example hydrohalic acids, e.g. hydrochloric or hydrobromic acid, also perchloric, nitric or thiocyanic acid, sulfuric or phosphoric acids, or organic acids, such for example as formic, acetic, propionic, glycollic, lactic, pyruvic, oxalic, malonic, succinic, maleic, fumaric, malic, tartaric, critic, ascorbic, hydroxymaleic or dihydroxymaleic acid, benzoic, phenylacetic, 4-aminobenzoic, 4-hydroxy-benzoic, anthranilic, cinnamic, mandelic, calicylic, 4-amino-salicylic, 2-phenoxy-benzoic, 2-acetoxy-benzoic acid, methane sulfonic, ethane sulfonic, hydroxyethane sulfonic, benzene sufonic, p-toluene sulfonic or sulfanilic acid, methionine, tryptophane, lysine or arginine.

The O-unsubstituted compounds are also of acidic character and therefore form salts with bases. The latter are preferably those of therapeutically acceptable alkali or alkaline earth metals, e.g. of sodium, potassium or calcium or of organic bases, for example aliphatic amines. The O-unsubstituted compounds also form metal complexes. Preferred metals for the latter are such as are physiologically tolerable, preferably iron, cobalt or magnesium, also copper or antimony.

Owing to their capacity to form very stable complexes with metals, e.g. the above shown metals, the compounds of Formula I have valuable pharmacological properties. For example, they inhibit the deposition of iron-containing pigments in the tissues or, in the case of a deposition of iron in the organism, they cause the iron to be excreted, for example in haemochromatosis and haemosiderosis and also in cases of cirrhosis of the liver. They may also be used for excreting other metals, for example copper, from the organism.

Particularly valuable compounds are those of Formula I, in which $R_1$ and $R_2$—CO stand for acyl radicals which are independent of each other, $R_1$ represents also hydrogen or an unsubstituted or substituted hydrocarbon radical and among these compounds primarily those of Formula I in which $R_1$ has the meaning given and $R_2$—CO stands for acetyl or free or esterified succinyl, their salts with therapeutically acceptable acids or organic amines, alkali- or alkaline earth metal hydroxides. Especially valuable compounds are the desferri-ferrioxamines B, G and $D_1$ and their salts of the last-mentioned kind.

The trihydroxamic acids mentioned at the beginning, their salts and metal complexes may be obtained for example synthetically. Such synthesis consists in combining 3 mols of 1-amino-5-hydroxyl-amino-pentane, 2 mols of succinic acid and one mol of a carboxylic acid or a compound which is convertible into one of these compounds, for example one that contains protecting groups or reactively converted functional groups, to form a compound of the Formula I, and, if desired, in a resulting compound having a terminal free amino group and a carboxyl group, condensing these groups intramolecularly to form a ring, and if desired, introducing or splitting off at any desired stage the acyl group or the hydrocarbon radical $R_1$, and/or exchanging the radical $R_2$—CO, and/or forming or splitting off the O-acyl group and/or, if desired, esterifying any free carboxyl group in a resulting compound and/or forming the free compounds, the salts and/or metal complexes of these compounds.

The starting materials mentioned may be condensed in succession, or individual radicals may be condensed together, and the resulting constituent parts then combined to form the entire chain or the ring.

Compounds convertible into 1-amino-5-hydroxyl-amino-pentane are, fore example, pentanes of the formula $$Z_1-CH_2-CH_2-CH_2-CH_2-CH_2-Z_2$$

wherein $Z_1$ and $Z_2$ represent an amino group and a radical convertible into a hydroxylamino group, respectively, or, conversely, a radical convertible into an amino group and a hydroxylamino group, respectively.

Radicals convertible into an amino or hydroxylamino groups are, for example, reactive esterified hydroxyl groups, e.g. hydroxyl groups esterified with hydrohalic acids or sulfonic acids which on reaction with ammonia or hydroxylamine yield the amino or hydroxylamino group; furthermore, groups that can be converted into the amino or hydroxylamino group by reduction, e.g. the nitro group, the hydroxylimino group, or the nitrile group. Above all, the groups convertible into the amino or hydroxyl amino group comprise the amino or hydroxylamino groups protected by radicals that can be split off by hydrolysis or reduction. Such protective groups are, for example, acyl groups, especially carbobenzoxy, phthaloyl, trifluoracetyl groups, primarily the tertiary butyloxycarbonyl group, and also e.g. the tosyl and trityl radicals. These protective groups can be split off in known manner by treatment with hydrolyzing by hydrogenolyzing agents.

Compounds convertible into succinic acid or the second carboxylic acid are for example the halides, anhydrides, azides, imides, imidazolides or esters of succinic acid or the second carboxylic acid.

Any carboxyl group not participating in the reaction is protected advantageously by esterification, e.g. with methanol, benzyl alcohol or para-nitro-benzyl alcohol.

When the condensation involves the free carboxyl groups, it is preferable to use a condensing agent, e.g. a carbodiimide, such as dicyclohexylcarbodiimide.

The synthesis of the trihydroxamic acids is advantageously performed according to this diagram of formulae:

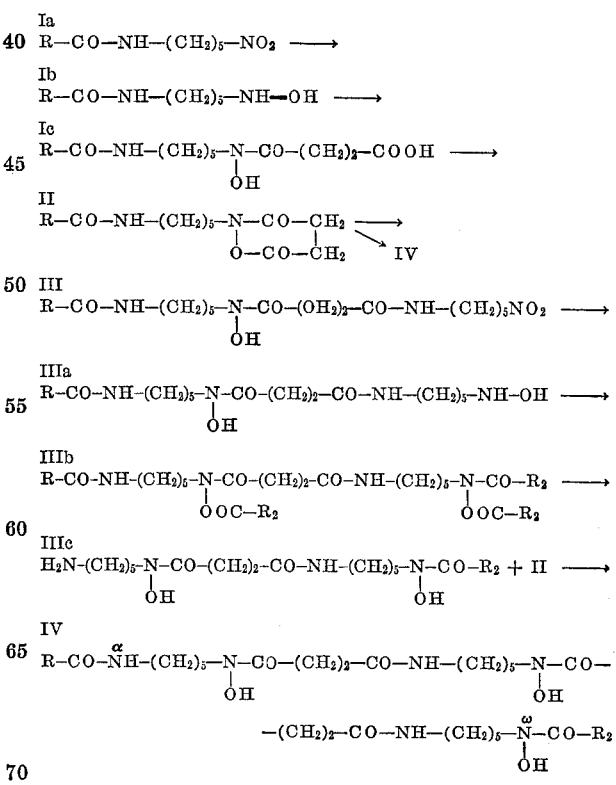

R—CO stands for an acyl group.

Like the compound Ib, the product mentioned under IIIa can also be converted in stages into the dihydroxamic acid and then into the trihydroxamic acid IV.

In this novel process, it has been found to be of particular advantage to form the N-substituted tetrahydro-3,6-dioxo-1,2-oxazines mentioned under II. These latter can be obtained from the compounds mentioned under Ic by treatment with a condensing agent, e.g. a carbodiimide, such as dicyclohexyl-carbodiimide. By this treatment, in a single process step, the terminal carboxyl group of the compounds mentioned under Ic is converted to form a reactive group, and the N-hydroxyl group is protected.

The trihydroxamic acids mentioned at the beginning or their salts may also be obtained when a metal complex of a compound of the Formula I, in which $R_1$ and $CO-R_2$ have the meanings given above, especially an iron complex, is treated with a mineral acid, a strong alkali or a complex forming substance, e.g. 8-hydroxy-quinoline, and the resulting metal-free compound isolated and, if desired, at any stage of the procedure the acyl group or the hydrocarbon radical $R_1$ is introduced or split off and/or the radical $CO-R_2$ is exchanged and/or an O-acyl group is formed or split off and/or, if desired, in a resulting compound having a free carboxyl group, such group is esterified and/or the free compound or a salt is formed.

In reacting the metal complexes mentioned with mineral acids, especially hydrochloric acid, it is preferable to extract first the metal, e.g. iron, from the aqueous acid solution by means of a suitable solvent, for example, ether, then to render the solution nearly neutral, and then to extract the metal-free compound with a solvent, e.g. n-butanol.

When a solution containing the metal complex is treated with a strong alkali, the metal usually separates as the hydroxide in the form of fine flakes and can be isolated, for example, by filtration or centrifuging. After that, upon neutralization or slight acidification of the solution, the metal-free compound can be extracted as described above.

When a complex forming substance is used to remove the metal, for example, 8-hydroxy-quinoline, the reaction is preferably performed in a lower alkanol, such as methanol. The precipitated metal complex is separated and any excess precipitant, such as 8-hydroxy-quinoline extracted from the aqueous solution, e.g. with chloroform, for example, after concentrating the filtrate.

In the resulting trihydroxamic acid any free 1-amino group present may be acylated, for example, with an acid anhydride in a bufferred alcoholic solution or with an acid halide in an aqueous, weakly alkaline medium. Any O-acyl derivatives formed can be converted into the O-unsubstituted $N_1$-acyl compounds e.g. by means of ammonia. The substitution of the 1-amino group by a hydrocarbon radical, e.g. the m-dinitrophenyl radical, or the exchange of the radical $CO-R_2$ can be performed in per se conventional manner.

N-acyl radicals that can be split off hydorgenolytically, for example the carbobenzoxy radical, can be split off in known manner at any stage. A free carboxyl group in a resulting compound, e.g. in desferri-ferrioxamine G, can be esterified by a method known in peptide chemistry.

There can be used as starting materials natural ferrioxamines and derivatives obtainable therefrom, for example, the $N_1-R_1$ compounds obtainable from the ferrioxamine B or G, in which $R_1$ has the meaning given above, or the derivatives of ferrioxamine G or its $N_1-R_1$-compounds having an esterified terminal carboxyl group, or the compounds obtained by total synthesis. The substitution of the 1-amino group of ferrioxamine B or G is performed in the usual manner. The $N_1$-acyl compounds are obtained, for example, by reacting said ferrioxamines with an acid anhydride in alcoholic solution. The free terminal carboxyl group in ferrioxamine G or its $N_1$-acyl derivatives can be esterified by the usual methods. The esterification is advantageously performed with diazo compounds.

Depeding on the precedure followed, the compounds are obtained in the free form or in the form of their salts. From the salts the free compounds can be obtained in the per se conventional manner. Likewise, the free compounds can be converted into the aforementioned acid addition salts or, if desired, into the alkali metal or alkaline earth metal salts or the salts of organic bases.

The O-unsubstituted compounds are converted into the metal complex by reacting them with a corresponding metal salt, for example the salt of a mineral acid, such as a metal chloride, sulfate or nitrate, or the salt of an organic acid, such as a metal acetate or metal sulfonate, or by reacting them with a metal alcoholate, for example, a metal ethylate.

The invention relates also to pharmaceutical preparations containing desferrioxamines or derivatives of the latter as above described.

Such pharmaceutical preparations therefore contain trihydroxamic acids of Formula I in which $R_1$ and $R_2$ have the meaning indicated above.

The preparations are capable of excreting iron from the organism by binding it in the form of an iron complex compound which is called ferrioxamine. Thus, in the case of deposition of ferriferous pigments in the organism they bring about excretion of the iron, for example in haemochromatosis and haemosiderosis and in cirrhosis of the liver. These properties are demonstrated for desferrioxamine B as follows:

Iron excretion in the dog

Normal dogs were given a single intravenous or subcutaneous injection of 50 mg. desferrioxamine B per kg. body-weight in the form of a 10% solution. The excretion of ferrioxamine and iron in the urine was then observed for 4 days. It was found that the highest concentrations of ferrioxamine—i.e. 80% of the amount excreted within 72 hours—appeared in the urine within the first 24 hours after the administration of desferrioxamine. During this period 23–26% of the desferrioxamine B dose could be traced in the urine. 13–14% of it was in the form of ferrioxamine, which corresponds to approx. 2 mg. iron. Following a daily subcutaneous dose of 50 mg. desferrioxamine B per kg. body-weight for 6 days in dogs, ferrioxamine first appeared in the urine after only 24 hours and the urinary levels of this compound then remained practically constant throughout the duration of the test. Altogether 18–19% of the desferrioxamine B administered was traced in the urine during an observation period of 8 days; 16–18% of it was in the form of ferrioxamine, which corresponds to approx. 10 mg iron.

Other pharmacological effects

In rabbits anaestetized with urethane, doses as high as 30 mg. desferrioxamine B per kg. are required to produce a temporary, slight fall in blood pressure; which is to be regarded as unspecific. No effect on respiration can be demonstrated.

Clinical effect

Preliminary clinical studies on normal test subjects and on patients with haemochromatosis and haemosiderosis have shown that the intravenous or intramuscular administration of 400–800 mg. desferrioxamine B in divided doses spread over the day leads to a considerable excretion of iron in the urine, the color of which may turn brownish red. The iron excretion is preceded by a rise in the plasma iron levels. In normal test subjects the iron excretion amounted to some 10–20 mg. per day initially and decreased slightly later on; desferrioxamine has not yet been administered to normal test subjects on a long-term basis. The amounts of iron excreted by normal test subjects are of the same order of magnitude as the values observed in dogs, due allowance being made for the difference in body-weight. In patients with haemochromatosis, iron excretion was 10–20 mg. daily at the beginning of treatment. Where the preparation was administered daily for several weeks, these patients excreted iron in quantities ranging from 20 to 80 mg. daily. There was also evidence that liver function, concomitant diabetes, and heart failure due to the haemochromatosis were improved at the same time. Pigmentation of the skin decreased appreciably in some patients in the course of treatment lasting 2–3 weeks.

Desferrioxamine B has a low acute toxicity. In the mouse, the mean lethal dose ($LD_{50}$) by the intravenous route is 340 mg./kg., and by the subcutaneous route 1,600 mg./kg. No signs of toxicity have been observed following oral administration of as much as 3 g./kg. The intoxication picture is not specific. In rats, the mean lethal dose ($LD_{50}$) by the intravenous route is 520 mg./kg., overt signs of intoxication—in the form of paralysis and spasm-occuring only in response to sub-lethal doses. If the preparation is administered subcutaneously or orally, the animals can survive a single dose of 1 g./kg. without showing signs of intoxication. The preparation is well tolerated locally in the rabbit eye in a solution of up to 3%.

The use of desferrioxamine B may be considered in the treatment of all diseases involving pathological deposition of iron in the organism, particularly haemochromatosis and haemosiderosis of varying aetiology, which may be associated, for example, with haemolytic anaemia and achrestie anaemia, or may follow frequent blood transfusions, or in the treatment of liver cirrhosis, a disease in which an elevated iron concentration can frequently be demonstrated in the liver.

The daily doses employed hitherto in human beings have ranged from 400 to 1200 mg. i.v. or i.m. Intravenous administration should be made as a drip infusion over a period of 6–10 hours. The contents of the ampoules should be dissolved or diluted in physiological saline prior to intravenous injection or infusion.

Especially valuable are preparations which contain compounds of Formula I in which $R_1$ has the meaning given above and $R_2$—CO stands for the acetyl radical or the free or esterified succinyl radical, their salts with therapeutically useful acids or organic amines, alkali or alkaline earth metal hydroxides. Especially preferred are the above desferri-ferrioxamines B, G, $D_1$ and E and their salts of the last-mentioned type.

The aforementioned trihydroxamic acids which are the active principle of the new preparations may be obtained by treating iron complexes of compounds of Formula I in which $R_1$ and CO—$R_2$ have the meanings given, with mineral acids, strong alkalies or complex-forming substances, for example 8-hydroxy-quinoline or N-nitrosophenylhydroxylamine ammonium salt, isolating the resulting iron-free compounds and, if desired, introducing into resulting compounds at any stage the acyl group or the hydrocarbon radical $R_1$ or, if desired, splitting it off and/or exchanging the radical CO—$R_2$ and/or forming O-acyl groups or eliminating them and/or, if desired, in resulting compounds with a free carboxyl group esterifying the latter, and/or forming the free compounds or the salts.

The new pharmaceutical preparations contain the above defined trihydroxamic acids in admixture with an organic or inorganic pharmaceutical excipient suitable for enteral or parenteral administration. They are prepared from the starting materials by conventional methods. Suitable excipients are substances that do not react with the new compounds, such, for example, as gelatine, lactose, glucose, sodium chloride, starches, magnesium stearate, talc, vegetable oils, benzyl alcohols, gums, polyalkylene glycols, white petroleum jelly, cholesterol or other known medicinal excipients.

The pharmaceutical preparations may be in solid form, for example, capsules, dragees, powders, suppositories, vials or in liquid form, as solutions, suspensions or emulsions. They may be sterilized and/or contain assistants such as preserving, stabilizing, wetting or emulsifying agents. They may also contain further therapeutically useful substances. The new compounds may also be used in veterinary medicine, for example in one of the forms mentioned above.

The following examples illustrate the invention.

EXAMPLE 1

*Streptomyces pilosus* strain NRRL 2857 is grown submerged on a nutrient solution containing per liter of tap water 20 grams of soybean flour and 20 grams of mannitol. The nutrient solution is sterilized in the inoculation flasks or in the fermenters for 20–30 minutes under a pressure of 1 atmosphere gauge. The pH-value of the sterilized nutrient solution is 7.2–7.6. For the inoculation up to 20% of a partially sporulating vegetative culture of the aforementioned organism is used. Incubation is carried out with vigorous shaking or stirring at 24–30° C., cultures in fermenters being aerated with about 2 volumes of air per volume of solution per minute. After an incubation period of 48–240 hours the culture solution displays its maximum content of ferrioxamines. The cultivation is discontinued, 0.1% of ferric chloride is added, and the mycelium together with other solid constituents is separated from the solution containing the bulk of ferrioxamines by filtration or centrifugation; if desired about 1% of a filter aid, for example Hyflo Supercel, is added to the culture solution prior to filtration. The filter residues are washed with water or aqueous methanol and the washings are combined with the culture filtrate. While stirring it continuously the resulting culture filtrate is treated with 2% of alumina, for example Frankonit. The mixture is thoroughly mixed and filtered and the resulting filtrate is subjected once or twice more to the adsorption operation. The filter residues are combined and washed repeatedly with water and aqueous methanol and then eluted twice or three times with a 1:4-mixture of pyridine and water. The eluate is clarified by filtration and then concentrated in vacuo. The resulting concentrates can be further worked up as they are (see Example 3), or a mixture of ferrioxamines in crude form can be isolated therefrom by means of freeze-drying.

When the nutrient solution described above is replaced by one which contains per liter of tap water the following ingredients, and cultivation and working up are carried out in a similar manner concentrates of a similarly high ferrioxamine content are obtained:

(a)

| | | |
|---|---|---|
| Saccharose | g | 20 |
| Sodium citrate | g | 0.9 |
| Ammonium acetate | g | 3 |
| Secondary potassium phosphate | g | 3 |
| Magnesium sulfate | g | 0.8 |
| Copper sulfate | mg | 0.01 |
| Manganese chloride | mg | 0.07 |
| Ferric citrate | mg | 20 |

(b)

| | | |
|---|---|---|
| Crude glucose | g | 10 |
| Soybean flour | g | 10 |
| Corn steep liquor | g | 20 |
| Sodium chloride | g | 5 |
| Sodium nitrate | g | 1 |
| Lime | g | 10 |

(c)

| | | |
|---|---|---|
| Rape extraction shucks | g | 20 |
| Crude glucose | g | 10 |
| Secondary potassium phosphate | g | 0.2 |
| Lime | g | 10 |

(d)

| | | |
|---|---|---|
| Flax meal | g | 40 |
| Crude glucose | g | 10 |
| Secondary potassium phosphate | g | 0.2 |
| Lime | g | 10 |

Instead of the aforementioned strain of the species *streptomyces pilosus* the following strains can be used, which are kept under the specified strain numbers at the Institute for Special Botany, Eidgenossische Technische Hochschule, Zurich. Analogous cultivation and working up yields culture filtrates having a similarly high content of ferrioxamine.

| Strain No.: | Streptomyces species |
|---|---|
| 9578 | S. griseoflavus (Krainsky) Waksman et manet Henrici |
| 15311 | S. griseoflavus |
| 11685 | S. pilosus Ettlinger et al. |
| 23258 | S. pilosus |
| 23305 | S. pilosus |
| 17635 | S. viridochomogenes (Krainsky) Waksman Henrici |
| 18055 | S. viridochromogenes |
| 6445 | S. olivaceus (Waksman) Waksman et Henrici |
| 7346 | S. olivaceus |
| 7437 | S. olivaceus |
| 22083 | S. aureofaciens Drugger |
| 22765 | S. aureofaciens |
| 18822 | S. galilaeus Ettlinger et al. |
| 14677 | S. lavendulae (Waksman et Curtis) Waksman et Henrici |
| 21510 | S. lavendulae |
| 21837 | S. polychromogenes Hagemann et al. |
| 23217 | S. polychromogenes |
| 23310 | S. polychromogenes |
| 10112 | S. griseus Waksman et Henrici |
| 13495 | S. griseus |
| 7419 | S. griseus |

EXAMPLE 2

Strain A 23978 of the species *Streptomyces aureofaciens* (Institute for Special Botany, Eidgenossische Technische Hochschule, Zurich) is grown as a submerged culture on a nutrient solution containing per liter of tap water. 20 grams of malt extract and 20 grams of distiller's solubles. Cultivation and working up according to Example 1 yields culture filtrates having a similarly high content of ferrioxamines.

EXAMPLE 3

A culture of 60 liters is prepared and worked up as described in Example 1. The eluate (about 6 liters) obtained with a mixture of pyridine and water is concentrated in vacuo to 3 liters. 870 grams of ammonium sulfate are dissolved in this concenrate and the solution is clarified by filtration or centrifugation, if necessary with the addition of 1% of Hyflo Supercel. By shaking the solution 3 to 4 times with benzyl alcohol or isopropanol, the ferrioxamines are transferred into the organic solvent. The organic phases are combined and dried with the aid of sodium sulfate. An excess of ether or ethyl acetate is added and the precipitated ferrioxamines are filtered off. Addition of a filter aid, for example Hyflo Supercel, prior to the precipitation facilitates the isolation of the precipitate, from which the ferrioxamines can be washed out with methanol or water. These eluates are evaporated or lyophilized to yield a preparation of ferrioxamines in enriched form.

EXAMPLE 4

20 grams of sodium chloride per liter are added to a culture filtrate obtained according to Example 1 or 2. The clear solution is extracted three times with 0.1 volume of a mixture containing 1 part by weight of phenol in 1 part by volume of chloroform. The organic phases are combined, filtered in the presence of Hyflo Supercel, and treated with an excess of ether. When the solution is shaken repeatedly with a small amount of water, the ferrioxamines are transferred into the aqueous phases which are then combined and shaken twice with ether to remove the phenol completely. By freeze-drying an orange to brownish red preparation of ferrioxamines is obtained which can be separated by paper chromatography.

EXAMPLE 5

20 liters of culture solution are treated with 400 grams of Hyflo Supercel and 200 cc. of an aqueous ferric sulfate solution of 10% strength, and filtered. After adding 3.6 kg. of sodium chloride, the filtrate is extracted in a counter current extractor with 2 liters of a mixture of phenol and chloroform (1 g.:1 cc.), the extract dried over sodium sulfate and then allowed to run in the course of one hour into a well stirred suspension of 20 grams of Hyflo Supercel in 2 liters of ether and 10 liters of petroleum ether. After filtering the powdery mixture of filter aid and precipitate, the filtrate is washed with about 2 liters of ether and then eluted 5 times with 600 cc. of methanol on each occasion. The combined eluates are gently evaporated to yield 10 grams of crude ferrioxamine in the form of a brown red powder.

EXAMPLE 6

4 grams of ferrioxamine are distributed in the system n-butanol-benzyl alcohol-water-saturated aqueous sodium chloride solution-N-hydrochloric acid (100:200:300:60:6) over 80 stages each of 100 cc. of organic phase and 100 cc. of aqueous phase. Evaluation of the distribution is carried out by biological testing and by measuring the extinction at 425 m$\mu$: of each fourth unit 2 cc. of upper and lower phase is taken and mixed with 32 cc. of methanol, a homogeneous solution being obtained whose concentration is suitable for both tests (cf. FIG. 1). The distribution fractions, put together in 4 groups according to this evaluation, contain, as shown by paper chromatography, in addition to the chief product ferrioxamine B (in distribution fraction III), other red-colored compounds having an antisideromycin activity and which are designated as ferrioxamines A, C, $D_1$, $D_2$, E and F.

| Fraction No. | Distribution fraction | Principal ferrioxamine |
|---|---|---|
| 6–18 | II | A. |
| 19–32 | III | B. |
| 33–62 | IV | C. |
| 63–80 | V | $D_1$, $D_2$, E and F. |

The distribution fraction III is agitated with 3 liters of petroleum ether. The deep red-colored aqueous phase is washed with chloroform, treated with sodium chloride up to a concentration of 10% and extracted exhaustively with a mixture of phenol and chloroform (1 g.:1 cc.). The phenol-chloroform extract is washed several times with 0.01 N-hydrochloric acid containing 10% of sodium chloride and filtered through a small column of 20 grams of Celite. The ingredients are precipitated by the addition of 25 grams of Hyflo Supercel, 500 cc. of ether and 1 liter of petroleum ether with stirring at 0° C. The powdery mixture of filter aid and precipitate is washed well with ether and then eluted with a little methanol. From the methanol eluate there are obtained on gentle evaporation 982 mg. of crude ferrioxamine B in the form of a brown-red powder.

The distribution fractions II, IV and V are worked up in the same manner.

EXAMPLE 7

Figure 3:
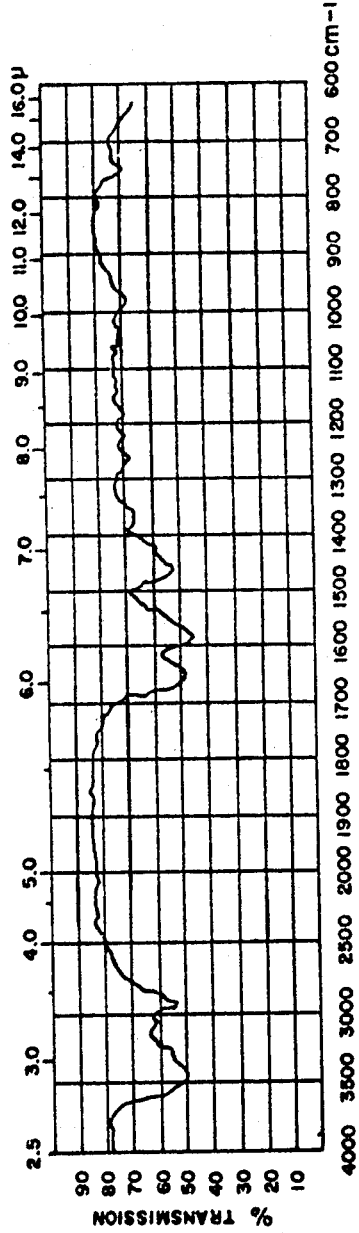
FIG. 3 shows the infra-red spectrum of ferrioxamine B in heavy paraffine oil.

1 gram of a preparation of ferrioxamine B prepared as described in Example 6 is subjected to zone electrophoresis according to J. Porath (Biochem. et Biophys. Acta 22, page 151 [1956] in a vertical glass column of 2.5 meters height and 2.6 centimeters diameter equipped with a cooling jacket and filled with cellulose powder. Electrolyte solutions: ⅓ N-acetic acid. The substance is dissolved in 20 cc. of water and the deep red solution is poured over the column from the top end of the anode. At a voltage of 1600 volts and a current intensity of 30 milliamperes the orange red ferrioxamine zone (about 10 cm. high) migrates at a rate of 3.9 cm. per hour towards the cathode at the bottom end of the column. To increase the separating action of the column this electric migration is compensated by a flow of electrolyte in the opposite direction, whereby the active principle, which is easy to identify by its characteristic color, is locally anchored in the column. In this operation accompanying substances having a greater or smaller electric mobility than the active principle are transferred into the cathode or anode chamber respectively and removed from the column. Under these conditions the active principle travels within 5 to 6 days through a liquid column of 4 to 5 meters length. The electrophoresis is then discontinued and the column is eluted with ⅓ N-acetic acid, fractions of 15 cc. each being collected and individually tested. The dark red, biologically active fractions are combined. 10% of sodium chloride is added and the solutions are exhaustively extracted with a mixture of 1 part by weight of phenol in 1 part by volume of chloroform. The combined extracts are repeatedly washed with 0.01 N-hydrochloric acid containing 10% of sodium chloride and then filtered through Celite. A filter aid (Hyflo Supercel) is added to the deep red, anhydrous filtrate which is then treated, while being stirred (with 5 times its volume of a 1:1-mixture of ether and petroleum ether, whereby the active principle is pracipitated on to the filter aid. The latter is filtered off and copiously washed with ether. The active substance is then eluted with a small amount of methanol and the red solution is evaporated to dryness in vacuo at 20° C. The preparation of ferrioxamine B obtained in this manner contains twice as much active principle per weight as did the starting material; it forms a red amorphous powder which is soluble in water, methanol, butanol, benzyl alcohol, phenol, dimethyl formamide and acetic acid and contains carbon, hydrogen, oxygen, nitrogen and iron. Its other properties are as follows: pK-value (66% aqueous methyl cellosolve)=9.54; equivalent weight=645; ultra-violet absorption maximum at 430 mμ

$$(\log \epsilon_{1\,cm}^{1\%} = 1.51)$$

infra-red spectrum: see FIG. 3.

By hydrolysing such a preparation in 6 N-hydrochloric acid for 6 hours at 110° C. a mixture is obtained which contains 5 ninhydrin-positive substances which display the following $R_f$-values in paper-chromatography:

| Substance No. | Solvent Mixture | |
|---|---|---|
| | Phenol plus water (8:2) | n-Butanol plus glacial acetic acid plus water (4:1:1) |
| 1 | 0.68 | 0.37 |
| 2 | 0.40 | 0.34 |
| 3 | 0.35 | 0.10 |
| 4 | 0.30 | 0.05 |
| 5 | 0.20 | 0.04 |

EXAMPLE 8

Figure 2:
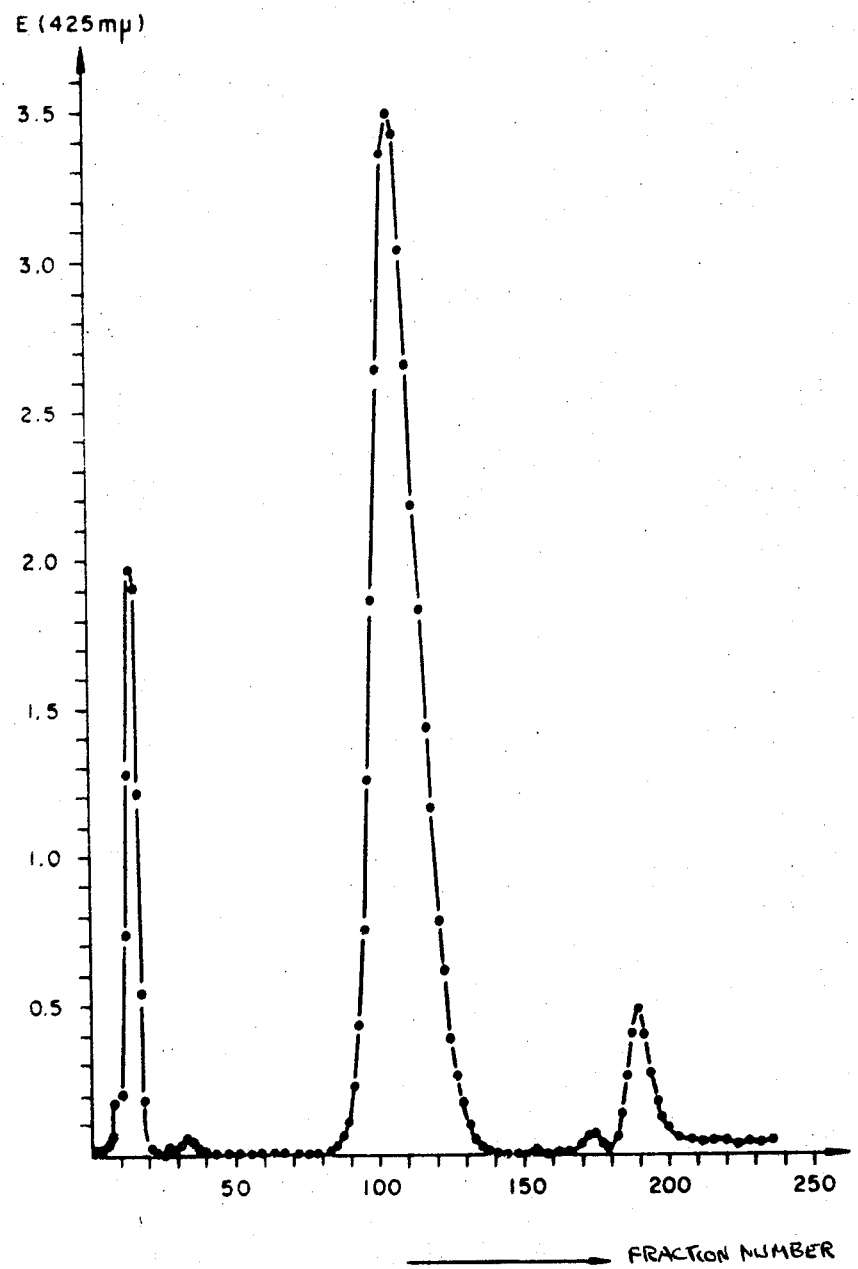
FIG. 2 shows a chromatogram of fraction III of FIG. 1 on Dowex 5–WX$_2$ using an ammonium acetate, buffer as eluting agent. . . . Extinction at 425 m$\mu$.

865 mg. of crude ferrioxamine B distribution fraction III (cm. Example 6) are chromatographed at 15–17° C. on a column (66 cm. x 7.14 cm.²) of Dowex-50 WX₂ (100/200 mesh). The ion exchanger is purified previously as described by Hirs et al., J. Biol. Chem. 219, page 623 (1956), converted into the ammonium form and brought on to the glass column by sedimentation. It is equilibrated with an 0.2-molar ammonium acetate buffer solution of pH 4.60 for 48 hours at a percolation rate of 200 cc. per hour. The substance is poured on to the column in 9 cc. of the above buffer solution and then developed with 0.2-molar buffer of pH 4.6 for 72 hours at a percolation rate of 100 cc. per hour. The elution medium is then continuously concentrated (gradient elution) using a mixing vessel of 1 liter capacity and 2-molar ammonium acetate buffer solution of pH 4.7. The eluate is collected in fractions of 40 cc. each shortly before the first colored zone is leaving the column. The fractions are combined according to their extinction at 425 mμ (see FIG. 2) and are then extracted in the above described manner using phenol-chloroform, ether-petroleum ether-Hyflo Supercel and methanol, as described in Examples 6 and 7.

| Fraction | Quantity in mg. | Substance |
|---|---|---|
| 13–18 | 62 | Unidentified. |
| 93–125 | 544 | Ferrioxamine B. Hydrochloride. |
| 185–197 | 36 | Unidentified. |

Ferrioxamine B hydrochloride is soluble in water, methanol, alcohol, phenol, dimethylformamide and glacial acetic acid, sparingly soluble in butanol and acetic acid, sparingly soluble in butanol and practically insoluble in chloroform, acetone, ether and ethyl acetate. Micro-analysis after 48 hours at 20° C. under 0.001 mm. of pressure: C, 46.17%; H, 7.46%; N, 12.90%; Cl, 5.29%; P, 0%; S, 0%; Fe, 8.54%. Titration:

$$pK_{MCS} = 9.74$$

equivalent weight 704. Absorption (H₂O): $\lambda_{max}$ 430 mμ

$$E_{1\,cm.}^{1\%} = 39.0$$

Infrared spectrum in heavy paraffin oil, see FIG. 3. $R_f$-value in system I: 0.44, in system V: 0.29 (Table I) partition coefficient in system VI: 0.228 (Table I).

Ferrioxamine B gives a positive color reaction with ninhydrin. It is readily oxidized with ferric chloride-potassium ferric cyanide reagent (G. M. Barton et al., Nature 170, 249 (1952)). In the other hand, it can be reduced with sodium dithionite with decoloration. The colorless solutions obtained recover their original red color rapidly when allowed to stand in the air. The iron bound in ferrioxamine B is removed from the complex when subjected to the action of a mineral acid or a strong alkali.

Iron-free ferrioxamine B (desferrioxamine B) is colorless. It can be transformed back to ferrioxamine B with ferric chloride. Desferrioxamine B reacts also with other metal ions with formation of the corresponding metal complexes, for example the greenish colored copper desferrioxamine.

EXAMPLE 9

20 mg. of a preparation of ferrioxamine B obtained as described in Example 8 are dissolved in 3 cc. of 1.2 N-hydrochloric acid and heated for 5 minutes on a boiling water bath. The initially reddish brown solution loses its color almost completely. It is evaporated to dryness in vacuo and the residue is dissolved in 0.2 cc. of water. 0.01 cc. each of this solution is used for the following paper-chromatographic examination. The solvent system used is a mixture of 7 parts by volume of n-butanol and 3 parts by volume of 6 N-hydrochloric acid. The following substances were identified:

| Substance | $R_f$ | a | b | c | d |
|---|---|---|---|---|---|
| Cadaverine | 0.12 | | Grey violet | | |
| Fe⁺⁺ | 0.17 | Pale yellow | | Deep red | |
| 1-amino-5-hydroxylamino pentane | 0.25 | | Grey violet | do | |
| Hydroxylamine | 0.34 | | | Pale red | Violetish red. |
| Unknown substance | 0.68 | | Bluish | | |
| Fe⁺⁺ | 0.84 | Yellow | | | |
| Unknown substance | 0.93 | | | Red | |

In the above table *a* signifies the characteristic colors of the substances recognisable on the papers, *b* color reaction with ninhydrin, *c* color reaction with triphenyl tetrazolium chloride+sodium hydroxide solution and *d* color reaction with the Czaki reagent. (All reagents as described in "Handbuch der Papiershromatographia," by I. M. Hais and K. Macek, publishers Gustav Fischer, Jena, 1958).

When instead of hydrochloric acid the hydrolysis is performed with hydriodic acid of 57% strength for 4 hours at 110° C., hydroxylamine, 1-amino-5-hydroxylaminopentane and $Fe^{+++}$ are absent from the paper chromatogram, but more cadaverine and $Fe^{++}$ are found.

A second test portion of ferrioxamine B is hydrolyzed with 1.2 N-hydrochloric acid in the manner described above. The hydrolysis mixture is then extracted with ether. The extract is dried with sodium sulfate and evaporated. Succinic acid in crystalline form can be obtained from the residue.

EXAMPLE 10

An aqueous solution of 450 mg. of a ferrioxamine B preparation obtained as described in Example 8 and 450 mg. of sodium bicarbonate is treated with a solution of 450 mg. of 2:4-dinitrofluorobenzene in 26 cc. of ethanol. The mixture is kept for 4 hours at room temperature and the alcohol is then evaporated in vacuo. The excess reagent is removed by shaking with ether. The deep reddish brown dinitrophenyl-ferrioxamine B is then easy to extract wtih n-butanol (ferrioxamine B itself remains under the same conditions in the aqueous phase). The butanolic extract is washed wtih water, dried and evaporated in vacuo. The residue is extracted with acetone and the insoluble brown residue (114 mg.) is filtered off. The acetone solution is then concentrated to about 5 cc. whereupon the dinitrophenyl-ferrioxamine B is precipitated as an amorphous orange-red powder. Yield: 338 mg.

On being subjected to paper-electrophoresis in dilute acetic acid the dinitrophenyl derivative migrates at 1000 volts in 2 hours a distance of 5.5 cm., while ferrioxamine B under identical conditions covers 18.5 cm.

EXAMPLE 11

For the isolation of the ferrioxamines A, C, $D_1$, $D_2$, E and F the distribution fractions II, IV and V (see Example 6) obtained in the counter-current distribution of crude ferrioxamine are chromatographed on Dowex 50-$WX_2$ (200/400 mesh) with an ammonium acetate buffer as eluting agent. The resin is previously purified by the method described by Hirs et al. (C. H. W. Hirs, S. Moore, W. H. Stein, J. Biol. Chem. 219, 623 (1956)). It is converted into the ammonium form and put into the glass column by sedimentation. It is equibrated for about 70 hours with the buffer solution used for the elution at a percolation rate of 20 cc., per hour and per sq. cm. before the substance is poured on the column. The substances are poured on the column in 1–10% solution depending on their solubility, and the chromatograms are developed at 23–25° C. at a percolation rate of 5–15 cc. per hour and per sq. cm. with an ammonium acetate buffer of pH 4.5 in increasing concentration (gradient elution). The chromatograms are evaluated by measuring the extinction of the eluate fractions (30–40 cc.) at 425 m$\mu$. The correspondingly collected eluate fractions are extracted exhaustively with a mixture of phenol and chloroform (1 g.:1 cc.) after the addition of 10% of sodium chloride. The deep red-colored extracts are washed thoroughly with 0.01 N-hydrochloric acid containing 10% of sodium chloride, filtered through a layer of Celite and the ingredients precipitated from the clear filtrates by the addition of ether and petroleum ether on to Hyflo Supercel. The mixture of substance and carrier is washed with ether to remove the phenol and then eluted with a little methanol. From the methanol eluates the ferrioxamines are obtained by gentle evaporation in the form of brown-red hygroscopic powder which is dried over phosphorus pentoxide for 50 hours at 25° C. under 0.03 mm. of pressure for the purpose of analysis.

Figure 6:
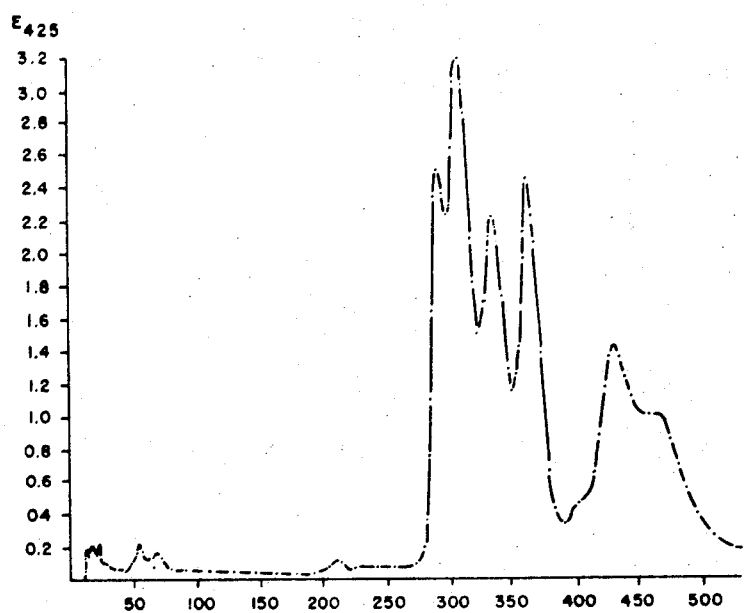
FIG. 6 shows a chromatogram of fraction II of FIG. 1 on Dowex 50–WX$_2$ using an ammonium acetate buffer as eluting agent. . . . Extinction at 425 m$\mu$.
Figure 10:
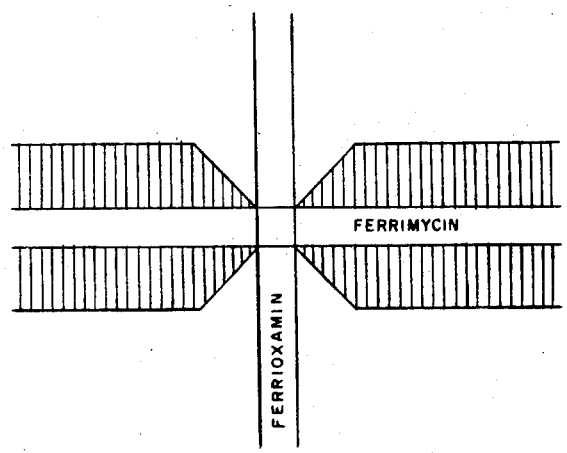
FIG. 10 shows the antagonism between ferrioxamines and ferrimycin in the modified Bonifas-test. The hatched area indicates inhibition of the growth of the test organism.

5 grams of fraction II (see Example 6) are chromatographed on a Dowex 50-$WX_2$ column of 90 cm. x 22 sq. cm. by the procedure described above (FIG. 6). Buffer solution at the beginning: 0.1-molar ammonium acetate pH 4.5. Percolation speed: 110 cc. per hour. Volumes of the eluate fractions: 35–40 cc. Switch over to gradient elution with a mixing vessel of 4 liters capacity and 1.75-molar ammonium acetate buffer of pH 4.70 at fraction No. 90.

| Fraction No. | Weight in mg. | Substances |
|---|---|---|
| 283–300 | 302 | Ferrioxamine A hydrochloride. |
| 301–325 | 488 | Ferrioxamine B plus A hydrochloride. |
| 326–352 | 393 | ⎫ |
| 353–385 | 452 | ⎬ Not closely characterized substances. |
| 416–445 | 415 | ⎭ |

Figure 5:
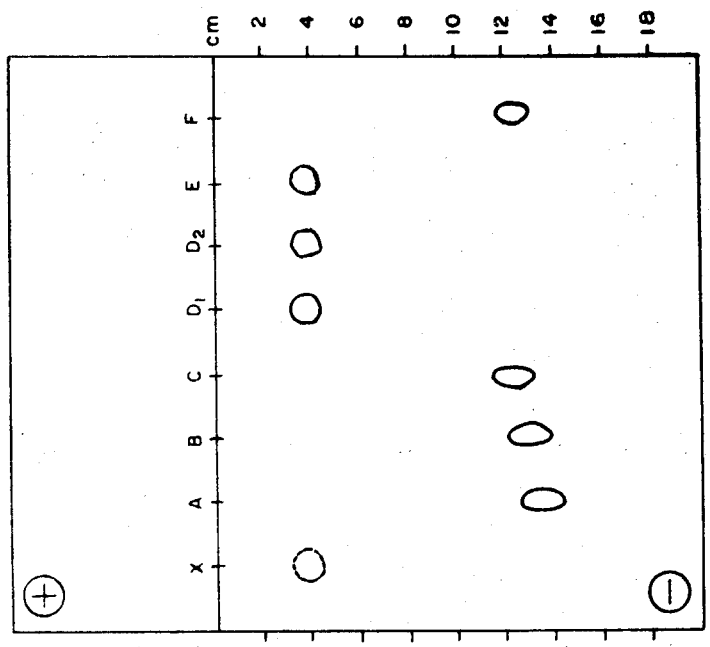
FIG. 5 shows paperelectrophoresis of the ferrioxamines, cm. path in 0.33 N acetic acid after 4½ hours at 220 v. In comparison fructose travels 3.9 cm.
Figure 4:
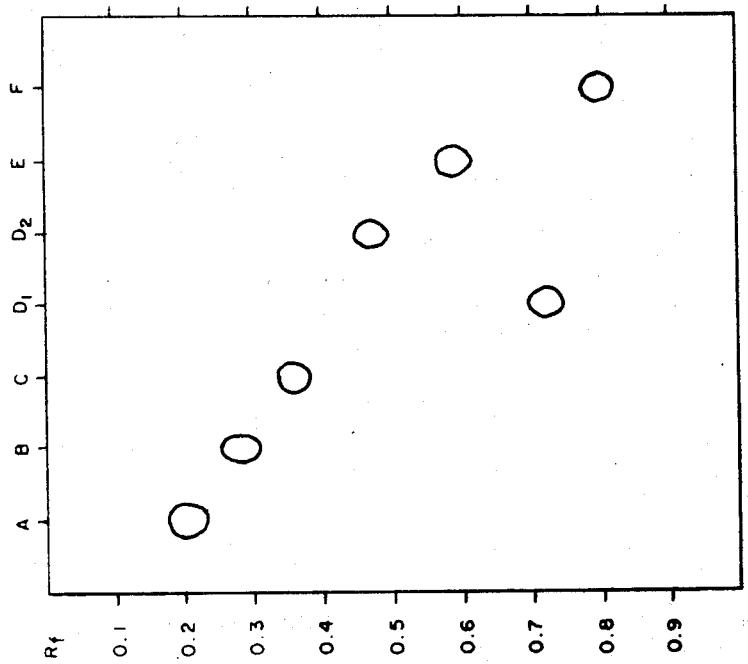
FIG. 4 shows a paperchromatogram of the ferrioxamines in the system V: tertiary butanol-water-saturated aqueous sodium chloride solution-0.1 N HCl (50:25: 25:1), paper impregnated with acetone-water-saturated aqueous sodium chloride solution (6:3:1).

Ferrioxamine A hydrochloride is a brown-red powder which is readily soluble in water, methanol, alcohol, glacial acetic and dimethylformamide. It is insoluble in ether, acetone, ethyl acetate and chloroform. $R_f$ in solvent system I: 0.35, in solvent system V: 0.21 (Table I). Partition coefficient in system VI: 0.111 (Table I). Paper electrophoresis cf. FIG. 5. Microanalysis: C, 44.21%; H, 7.52%; N, 12.63%; Fe, 7.95%; Cl, 5.93%. Titration: $pK_{MCS}$: 9.89, equivalent weight: 634. Ultraviolet spectrum in water: $\lambda$ max 430 m$\mu$ $$(E^{1\%}_{1cm.} = 37)$$

Figure 11:
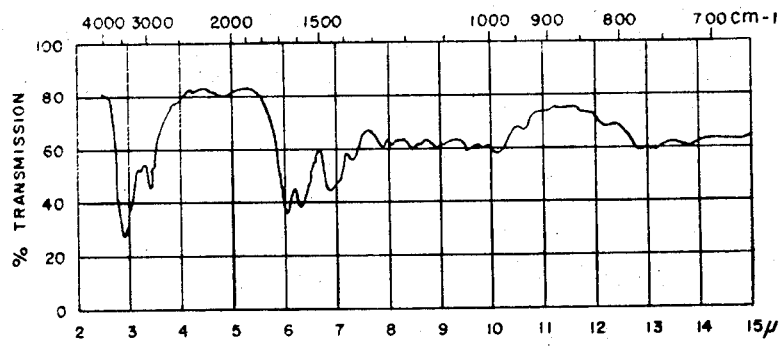
FIG. 11 shows the infra-red spectrum of ferrioxamine A in potassium bromide.

The infrared spectrum in potassium bromide shows: inter alia bands at 2.92$\mu$ (s.), 3.42$\mu$ (m.), 6.10$\mu$ (s.), 6.32$\mu$ (s.), 6.88$\mu$ (m.), 7.30$\mu$ (w.), 7.92$\mu$ (w.), 8.10$\mu$ (w.), 8.49$\mu$ (w.), 8.98$\mu$ (w.), 9.55$\mu$ (w.), 10.15$\mu$ (w.), 10.67$\mu$ (w.), (see FIG. 11).

Ferrioxamine A gives a positive colour reaction with ninhydrin. The iron bound in ferrioxamine A is removed from the complex when subjected to the action of a mineral acid or of strong alkali. Iron free ferrioxamine A is colorless. It can be transformed back to ferrioxamine A with ferric chloride. It reacts also with other metal ions with formation of the corresponding metal complexes, for example the greenish colored copper-complex.

EXAMPLE 12

Figure 7:
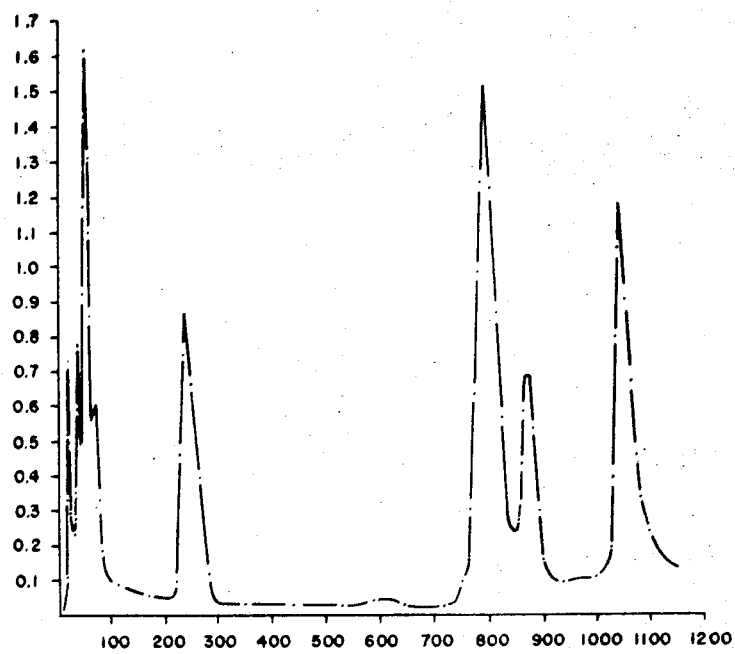
FIG. 7 shows a chromatogram of fraction IV of FIG. 1 on Dowex 50–WX$_2$ using an ammonium acetate buffer as eluting agent. . . . Extinction at 425 m$\mu$.

5 grams of fraction IV (see Example 6) are chromatographed on a Dowex 50-$WX_2$ column by the method described in Example 11; buffer solution at the beginning: 0.1-molar ammonium acetate, pH 4.5. Percolation rate: 110 cc. per hour. Volumes of the eluate fractions: 35–40 cc. (see FIG. 7). Switch over to gradient elution with 1-molar ammonium acetate of pH 4.6 at fraction 720, with 2-molar ammonium acetate pH 4.7 at fraction 963:

| Fractions No. | Weight in mg. | Substances |
|---|---|---|
| 34–46 | 135 | Not closely characterized substances. |
| 54–68 | 226 | |
| 218–284 | | Yellow-green fluorescent substance not isolated. |
| 780–830 | 430 | Ferrioxamine B hydrochloride. |
| 860–900 | 194 | Ferrioxamine C hydrochloride. |
| 1034–1080 | 360 | Not closely characterized substance. |

Ferrioxamine C hydrochloride shows approximately the same solubilities as A. $R_f$ in solvent system I: 0.54, in solvent system V: 0.37 (Table I). Paper electrophoresis see FIG. 5; partition coefficient in system VI: 0.489 (Table I). Microanalysis: C, 48.33%; H, 7.92%; N, 10.20%; Cl, 5.15%; Fe, 6, 182%. Titration: $pK_{MCS}$: 8.88; equivalent weight 762. Ultraviolet spectrum in water: $\lambda$ max 430 m$\mu$ $$(E^{1\%}_{1cm.} = 39)$$

Figure 12:
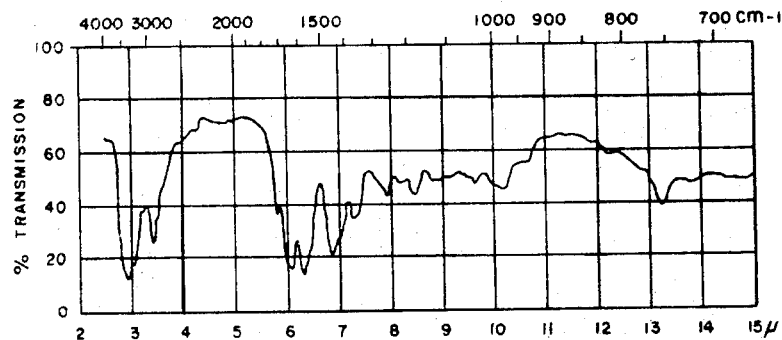
FIG. 12 shows the infra-red spectrum of ferrioxamine C in potassium bromide.

The infrared spectrum in potassium bromide shows inter alia bands at 2.92$\mu$ (s.), 3.43$\mu$ (s.), 5.85$\mu$ (m.), 6.10$\mu$ (s.), 6.33$\mu$ (s), 6.87$\mu$ (s.), 7.30$\mu$ (m.), 7.95$\mu$ (m.), 8.23$\mu$ (w.), 8.52$\mu$ (m.), 9.65$\mu$ (w.), 13.23$\mu$ (m.), (see FIG. 12).

Ferrioxamine C gives a positive color reaction with ninhydrin. The iron bound in ferrioxamine C is removed from the complex when subjected to the action of a mineral acid or of strong alkali. Iron free ferrioxamine C is colorless. It can be transferred back to ferrioxamide C with ferric chloride. It reacts also with other metal ions with formation of the corresponding metal complexes, for example the greenish colored copper-complex.

EXAMPLE 13

148 grams of fraction V (see Example 6) are prefractionated on a column of Dowex 50-WX$_2$ of 150 cm. x 79 sq. cm. The chromatogram is developed at a percolation rate of 2 to 3 liters per hour for 24 hours each with 0.1-molar, 0.2-molar, 0.6-molar and for 100 hours with 1.8-molar ammonium acetate buffer of pH 4.7. Fractions of 5 liters are collected. The combined fractions 2–5 contain predominantly ferrioxamines $D_1$, $D_2$ and E (44 grams), 48–55 mainly ferrioxamine F (8.4 grams).

Rechromatography of fractions 2–5

5 grams of fraction 2–5 are chromatographed under the same conditions as fraction II but without any gradient elution (see FIG 8).

| Fractions No. | Weight in mg. | Substances |
| --- | --- | --- |
| 48–56 | 980 | Ferrioxamine $D_1$ and $D_2$. |
| 66–80 | 898 | Ferrioxamine E. |

The mixture of $D_1$ and $D_2$ (980 mg.) isolated from fractions 48–56 with phenol-chloroform is dissolved in 100 cc. of water, saturated with sodium chloride and extracted twice with the same volume of chloroform. After being dried over sodium sulfate and evaporated, the chloroform extract leaves 697 mg. of ferrioxamine $D_1$. The aqueous refined phase is washed thoroughly with chloroform and then extracted with a mixture of phenol and chloroform. On working up this extract in the usual manner 95 mg. of ferrioxamine $D_2$ are obtained. Ferrioxamine $D_1$ is readily soluble in water, methanol, alcohol, glacial acetic acid, methyl Cellulosolve and chloroform, sparingly soluble in ether, acetone, ethyl acetate, pyridine and dimethylformamide. It crystallizes from a mixture of methanol and ether in red needles. After being crystallized three times it melts at 194–200° C. $R_f$ in solvent system I: 0.73, $R_f$ in solvent system V: 0.72 (Table I). Partition coefficient in system VI: 1.80 (Table I). Electrophoresis see FIG. 5. Microanalysis: C, 49.06%; H, 7.50%; N, 12.56%; Cl, 0%; Fe, 8.45%. Titration: no acid or basic functions detectable. Ultraviolet spectrum in water: λ max 430 mμ

$$(E_{1\,cm.}^{1\%} = 44)$$

Figure 13:
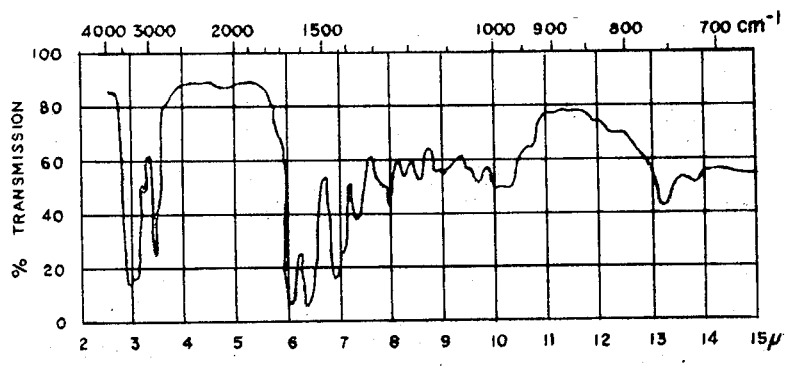
FIG. 13 shows the infra-red spectrum of ferrioxamine $D_1$ in potassium bromide.

Infrared spectrum in potassium bromide: inter alia bands at 2.95μ (s.), 3.06μ (s.), 3.25μ (w.), 3.43μ (s.), 6.08μ (s), 6.35μ (s.), 6.86μ (s.), 7.30μ (m.), 7.94μ (m.), 8.20μ (w.), 8.49μ (w.), 8.83μ (w.), 9.00μ (w.), 9.65μ (w.), 10.00μ (w.), 10.31μ (w.), 10.67μ (w.), 12.20μ (w.), 13.30μ (m.) (see FIG. 13).

Ferrioaxmine $D_1$ gives no color reaction with ninhydrin. The iron bound in ferrioxamine $D_1$ is removed from the complex when subjected to the action of a mineral acid or of strong alkali. Iron free ferrioxamine $D_1$ is colorless. It can be transformed back to ferrioxamine $D_1$ with ferric chloride. It reacts also with other metal ions with formation of the corresponding metal complexes, for example the greenish colored copper-complex.

Figure 16:
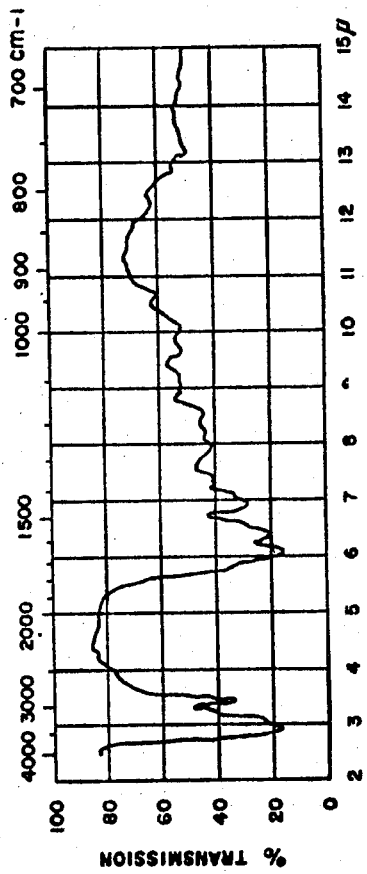
FIG. 16 shows in infra-red spectrum of ferrioxamine $D_2$ in potassium bromide.

Ferrioxamine $D_2$.—Infrared spectrum in potassium bromide: inter alia bands at 2.95μ (s.), 3.43μ (m.), 6.08μ (s.), 6.36μ (s.), 6.90μ (s.), 8.49μ (w.), 8.87μ (w.), 9.65μ (w.), 10.05μ (w.), 10.70μ (w.), 13.22μ (w.) (see FIG. 16). $R_f$ in solvent system I: 0.64, $R_f$ in solvent system V: 0.68 (Table I). Paper electrophoresis see FIG. 5.

Ferrioxamine E.—The ferrioxamine E obtained from fractions 66–80 (898 mg.) is soluble in glacial acetic acid sparingly soluble to insoluble in most solvents, particularly in water and methanol. Recrystallization twice from much water and acetone yields a microcrystalline powder. $R_f$-values in solvent system I: 0.68, in solvent system V: 0.59 (Table I). Paper electropheresis see FIG. 5. Partition coefficient in system VI: 1.59 (Table I). Microanalysis: C, 49.80%; H, 7.37%; N, 12.48%; Cl, 0%; Fe, 8.14%. Titration: no acid or basic functions detectable. Ultraviolet spectrum in water: λ max 430 mμ

$$(E_{1\,cm.}^{1\%} = 42)$$

Figure 14:
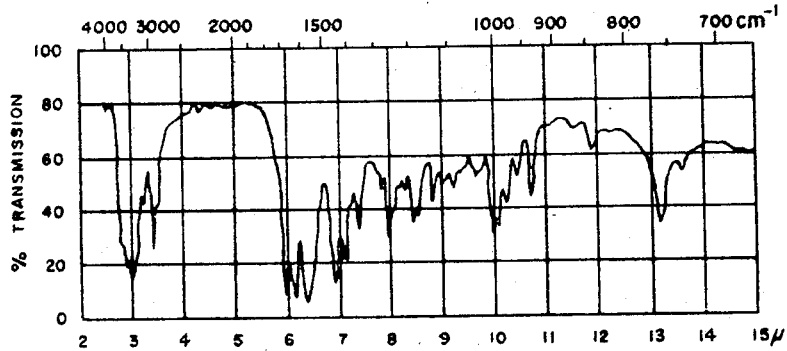
FIG. 14 shows the infra-red spectrum of ferrioxamine E in potassium bromide.

The infrared spectrum in potassium bromide shows inter alia bands at 2.92μ (s.), 3.02μ (s.), 3.45μ (s.), 5.96μ (s.), 6.15μ (s.), 6.36μ (s.), 6.90μ (s.), 7.10μ (m.), 7.15μ (m.), 7.39μ (m.), 7.82μ (w.), 7.98μ (m.), 8.45μ (w.), 8.54μ (w.), 8.85μ (w.), 9.01μ (w.), 9.20μ (w.), 9.98μ (m.), 10.07μ (w.), 10.23μ (w.), 10.43μ (w.), 10.71μ (w.), 11.87μ (w.), 13.20μ (m.), 13.66μ (w.) (see FIG. 14).

Ferrioxamine E gives no color reaction with ninhydrin. The iron bound in ferrioxamine E is removed from the complex when subjected to the action of a mineral acid or of strong alkali. Iron free ferrioxamine E is colorless. It can be transformed back to ferrioxamine E with ferric chloride. It reacts also with other metal ions with formation of the corresponding metal complexes, for example the greenish colored copper-complex.

Rechromatography of fractions 48–55

Figure 15:
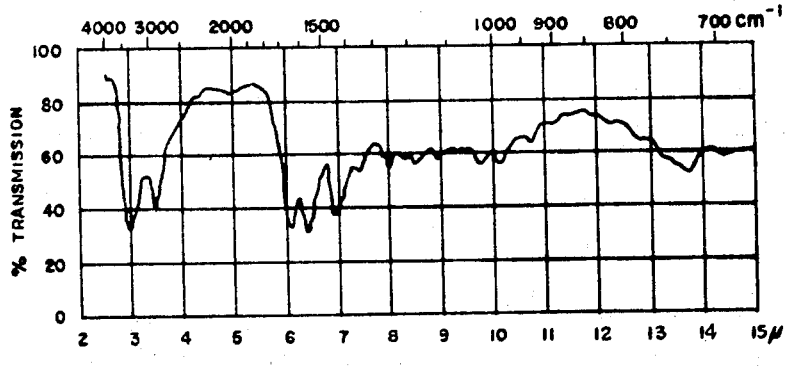
FIG. 15 shows the infra-red spectrum of ferrioxamine F in potassium bromide.

5 grams of fractions 48–55 are rechromatographed under the same conditions as fractions 2–5 (see above). Buffer solution at the beginning: 0.5-molar ammonium acetate of pH 4.7. Switch over to gradient elution with a mixing vessel of 4 liters capacity and the addition of 2-molar ammonium acetate buffer of pH 4.7 at fraction 663 (cf. FIG. 9). Fractions 821–880 contain 1.12 grams of material which consists chiefly of ferrioxamine F. For the purpose of further purification this material is subjected to Craig's countercurrent distribution over 20 stages (10/10 cc.) in the system n-butanol-water. The contents of the elements are then extracted with 80 cc. of petroleum ether each, the petroleum ether phases are discarded and the aqueous refined product lyophilized. With the material (570 mg.) obtained from the elements 1–4 the distribution is repeated over 30 stages. From element 5 there are obtained 64 mg. of paper-chromatographically uniform ferroxamine F hydrochloride in the form of a brown-red powder. Ferroxamine F hydrochloride is readily soluble in water, methanol, pyridine, glacial acetic acid, ethanol, dimethylformamide; sparingly soluble in chloroform, insoluble in ethyl acetate, acetone and ether. Microanalysis: C, 50.44%; H, 7.29%; N, 10.53%; Cl, 4.10%; Fe, 5.57%; $R_f$ in solvent system V: 0.80 (Table I). Partition coefficient in system VI: 3.12, (Table I). Electrophoresis see FIG. 5. Titration: $pK_{MCS}$ 9.75, equivalent weight 695. The infrared absorption spectrum in potassium bromide shows inter alia bands at 2.95μ (s.), 3.45μ (m.), 6.10μ (s.), 6.37μ (s.), 6.92μ (m.), 7.40μ (w.), 7.97μ (w.), 8.50μ (w.), 8.88μ (w.), 9.72μ (w.), 10.10μ (w.), 10.70μ (w.), 13.75μ (w.) see FIG. 15. Ultraviolet absorption in $H_2O$: λ max. 430 mμ, $$(E_{1\,cm.}^{1\%} = 34)$$

Ferrioxamine F gives a positive color reaction with ninhydrin. The iron bound in ferrioxamine F is removed from the complex when subjected to the action of a mineral acid or of strong alkali. Iron free ferrioxamine F is colorless. It can be transformed back to ferrioxamine F with ferric chloride. It reacts also with other metal ions with formation of the corresponding metal complexes, for example the greenish colored copper-complex.

EXAMPLE 14

A suspension of 100 grams of fresh baker's yeast in 1 liter of methanol is vigorously stirred for 30 minutes, then filtered and the methanolic solution is concentrated in vacuo to 200 cc. This concentrate is treated with 200 cc.

of water and the solution is clarified by filtration or centrifugation. The clarified solution is extracted three times with a mixture of 1 part by weight of phenol in 1 part by volume of chloroform. A little filter aid (Hyflo Supercel) is added to the combined organic phases and this suspension is treated while being continuously stirred with an excess of ether. The precipitated crude ferrioxamine, together with the filter aid, is filtered off, washed with ether and dried. The ferrioxamines are eluted from the filter aid with methanol. The methanolic solution is cautiously evaporated in vacuo to yield the ferrioxamines in the form of an active reddish brown resin which can be purified by paper-chromatography.

Preparations having a similarly high content of ferrioxamines are obtained when instead of baker's yeast a commercial yeast extract, expressed brewer's yeast or a fresh yeast culture is worked up as described above.

EXAMPLE 15

Representatives of the family of the chlorophyceae, for instance *Chlamydomonas eugametos*, are cultivated submerged at 24° C. on a nutrient solution containing:

| | |
|---|---|
| Magnesium sulfate _____g____ | 2.5 |
| Secondary potassium phosphate _____g____ | 1.25 |
| Urea _____g____ | 1.05 |
| Tap water _____liter__ | 1 |
| Trace element solution _____cc____ | 10 |

The trace element solutions contain per liter:

| | Grams |
|---|---|
| $CaCl_2$ _____ | 8.35 |
| $H_3BO_3$ _____ | 11.42 |
| $FeSO_4.7H_2O$ _____ | 4.98 |
| $ZnSO_4.7H_2O$ _____ | 8.82 |
| $MnCl_2.4H_2O$ _____ | 1.44 |
| $H_2MoO_4$ _____ | 0.71 |
| $CuSO_4.5H_2O$ _____ | 1.57 |
| $Co(NO_3)_2.6H_2O$ _____ | 0.49 |
| Complexon III _____ | 3 |

The nutrient solution is sterilised in the culture vessels for 20 to 30 minutes at 1 atmosphere gauge, and inoculated with up to 20% of a submerged culture. The cultures are aerated in the shaking vessels of 4 liter capacity continuously with ¼ volume of air per volume of solution per minute. After a cultivation period of 4–12 days under continuous irradiation the intensely green cultures are worked up. Without filtering, the cultures are treated with 2% of alumina, for example Frankonit, and vigorously mixed. The suspension is filtered with addition of a filter assistant and the solution is again treated with 2% of alumina, stirred and filtered. The combined filter residues are washed with water and methanol and then eluted with a mixture of pyridine and water (1:4). The azeotropic mixture is concentrated in vacuo and the ferrioxamines are isolated from the concentrates by freeze-drying. The reddish brown preparations can be further enriched as described above.

EXAMPLE 16

Young tomato plants (*Solanum lycopersicum* L. of the family of the Solanaceae) about 50 cm. high are squeezed out in a juice press. 1 liter of the juice is freed from chlorophyll by being extracted three times with ethyl acetate. 290 grams of ammonium sulfate are added to the brown aqueous phase, the resulting solution is filtered and then extracted three times with benzyl alcohol. The combined organic phases are dried by adding sodium sulfate and then treated with an excess of ethyl acetate. The resulting precipitate is washed with ether and then taken up in a small amount of water. Freeze-drying finally yields an active ferrioxamine preparation which can be worked up as described in the preceding examples.

Preparations having a similar activity are obtained by using leaves of Rheoe discolor instead of tomato plants.

EXAMPLE 17

*Bacillus subtilis* is cultivated by the submersion method on a nutrient solution containing per liter of tap water 10 grams of crude glucose, 5 grams of peptone, 3 grams of meat extract, 5 grams of potassium chloride and 10 grams of lime. The cultures are incubated at 33–37° C. while being aerated by shaking or stirring. After an incubation period of 48–96 hours the cultures are treated without being filtered with 2% of alumina (Frankonit), vigorously stirred and then clarified by filtration or centrifugation. The sediment is washed with methanol and then eluted with a 1:4-mixture of pyridine and water. The eluate contains the bulk of the ferrioxamines, which are isolated as described above.

EXAMPLE 18

(a)
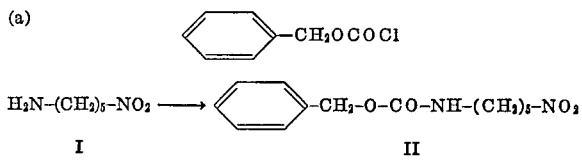

13.2 grams of 1-amino-5-nitro-pentane (I) [prepared according to H-Bickel et al., Helv. Chim., Acta, 43, 904 (1960)] are taken up in 1 liter of acetone and mixed with 1 liter of 0.1 N-sodium bicarbonate solution. While cooling with ice and stirring vigorously a solution of 17.0 grams of carbobenzoxychloride in 200 cc. of anhydrous tetrahydrofuran is slowly added and the mixture is kept for 7 hours at 0° C. On completion of the reaction the bulk of the acetone is evaporated in vacuo and the remaining aqueous solution is agitated five times with 100 cc. of chloroform on each occasion. The chloroform extracts are washed successively with a small amount of 2 N-hydrochloric acid, saturated sodium bicarbonate solution and water, dried over sodium sulfate and evaporated, to yield 25.8 grams of colorless, amorphous product II of melting point 53° C.

(b)
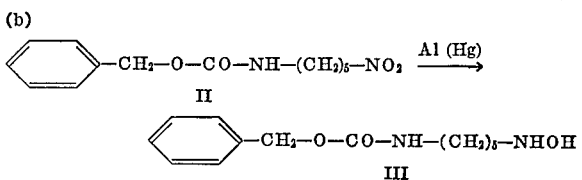

A solution of 24.0 grams of product II in 400 cc. of moist 1:2-dimethoxyethane is stirred with 60 grams of freshly prepared aluminum amalgam for 4 hours at 0° C. The aluminum oxide sludge is then filtered off and the filtrate is evaporated. As revealed by its paper chromatogram (system: toluene-n-butanol saturated with water), the evaporation residue (product of the Formula III; 16.6 grams) is substantially unitary. The substance is converted into the hydrochloride of M.P. 83–85° C. which is readily soluble in alcohol and chloroform.

From 1-benzoylamino-5-nitropentane of melting point 78° C., the 1-benzoylamino-5-hydroxylamino-pentanehydrochloride of melting point 132–133° C. can be prepared in an analogous manner.

(c)

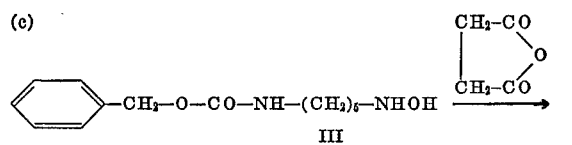

A solution of 16 grams of product III in 150 cc. of absolute pyridine is treated with 6.4 grams of succinic anhydride and the whole is kept for 15 hours at 22° C. under nitrogen. The pyridine is then evaporated in vacuo.

The residue, product IV (20.5 grams), is recrystallized from a mixture of ethanol and diethyl ether, M.P. 115–116° C. By heating with dicyclohexyl-carbodiimide there is obtained product V, which after recrystallization from diethyl ether melts at 84–85° C.

In an analogous manner from 1-benzoylamino-5-hydroxylamino-pentane there is obtained 1-benzoylamino-5-(N-succinyl-hydroxylamino)-pentane melting at 114–115° C. (a compound readily soluble in alcohol and ethyl acetate and sparingly soluble in diethyl ether), and therefrom the N-(5'-benzoylamino-pentyl)-tetrahydro-3,6-dioxo-1,2-oxazine of melting point 104–106° C.

(d)

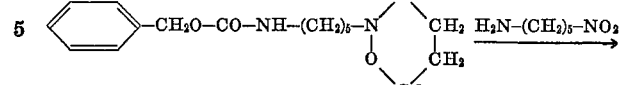

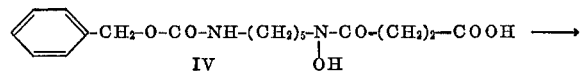

20.0 grams of product V and 8.0 grams of 5-nitro-1-amino-pentane are dissolved in 300 cc. of tetrahydrofuran and the whole is heated at the boil for 2½ hours under nitrogen. Evaporation in vacuo yields 27.1 grams of crude product VI, which is chromatographed on 1 kg. of silica gel. The fractions (10.3 grams) that can be eluted with a 9:1-mixture of chloroform and methanol contain considerably enriched product VI (one acid group can be titrated; ferric chloride test positive). The compound melts at 104–105° C.

In an analogous manner from N-(5-benzoylamino-pentyl)-tetrahydro-3,6-dioxo-1,2-oxazine there is obtained 1 - benzoylamino-5-[N-(5-nitropentylaminosuccinyl)-hydroxylamino]-pentane of M.P. 114–116° C., a compound which is readily soluble in alcohol, soluble in ethyl acetate and chloroform and sparingly soluble in diethyl ether.

(e)

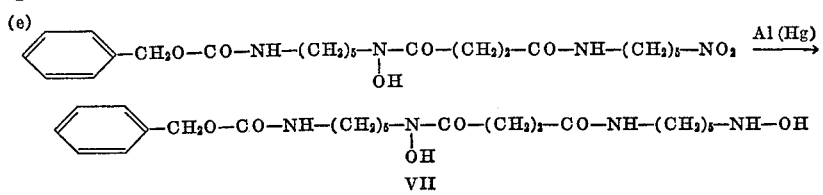

10.0 grams of product VI are reduced as described under (b) above with 30 grams of aluminum amalgam in 100 cc. of moist 1:2-dimethoxyethane. The resulting product VII (6.5 grams) is used as it is.

In an analogous manner from the corresponding 1-benzoylamino derivative there is obtained 1-benzoylamino - 5-[N-(5'-hydroxylamino-pentylamino-succinyl)-hydroxylamino]-pentane whose 5'-monoacetyl derivative melts at 165° C.; the triacetyl derivative is obtained as a colorless viscous oil. The 5'-monoacetyl derivative may be prepared from N-(5'-benzoylamino-pentyl)-tetrahydro-3,6-dioxo-1,2-oxazine (cf.d) by reaction with 1-amino-5-(N-acetyl-hydroxylamino)-pentane.

(f)

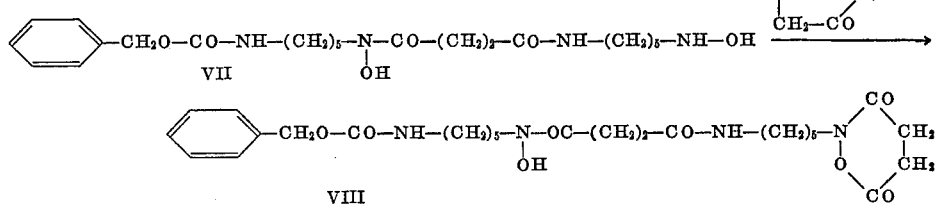

6.3 grams of product VII and 1.4 grams of succinic anhydride are reacted in 60 cc. of absolute pyridine as described above under (c). Yield: 7.4 grams of product VIII.

(g)

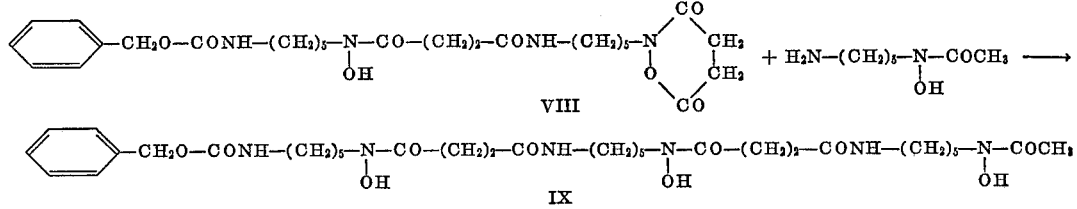

When the process described above under (d) is performed with 7.3 grams of product VIII and 2.2 grams of 1-amino-5-(N-acetyl-hydroxylamino)-pentane in 100 cc. of tetrahydrofuran, there are obtained 9.4 grams of crude product IX which is chromatographed on 350 grams of silica gel. Product IX is again found in the fractions (3.8 grams) eluted with a 7:3-mixture of chloroform and methanol.

Instead of using 1-amino-5-(N-acetyl-hydroxylamino)-pentane for the reaction, product VIII may also be reacted with 1 - amino-5-(N-succinyl-monomethylester)-O-acetyl-hydroxylamino-pentane of the formula

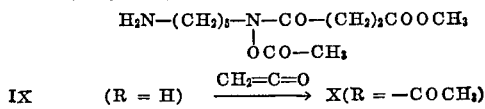

which may be prepared from product IV by esterification, acetylation and hydrogenolytic elimination of the carbobenzoxy group. The resulting product has the formula

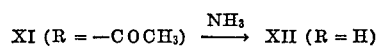

2.3 grams of product XI are dissolved in 50 cc. of methanol saturated with ammonia at 0° C. and the solution is kept for 18 hours. Evaporation yields 2.1 grams of a powder which is extracted three times with ether, whereupon product XII is obtained as an insoluble residue (1.4 grams). For purification it is dissolved in a minimum of methanol and precipitated with diethyl ether. Product XII is 30 - methyl-7,18,29-trihydroxy-8,11,19,22, 30 - pentaoxo - 1,7,12,18,23,29 - hexaaza - triacontane whose hydrochloride melts at 171–173° C. Its acetyl derivative melts at 185° C.

Product IXa described under (g) can be further acylated as described under (h) and decarbobenzoxylated and desacetylated according to (i) and (k) to obtain the 30 - (β - carbomethoxyethyl) - 7,18,29-trihydroxy-8,11, 19,22,30-pentaoxo-1,7,12,18,23,29-hexaaza-triacontane.

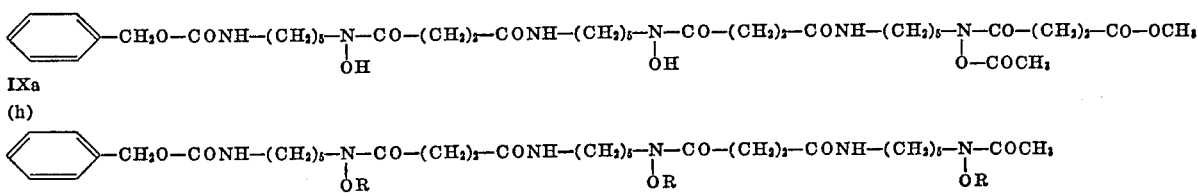

IXa (h)

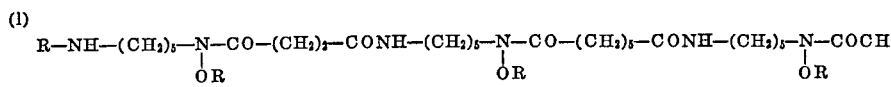

(i)

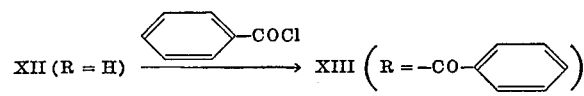

A slow current of ketene is introduced for one hour into an ice-cooled solution of 3.7 grams of product IX in 200 cc. of tetrahydrofuran. The whole is then evaporated in vacuo, and the residue is taken up in 200 cc. of ethyl acetate and washed successively with a small amount of 2 N-hydrochloric acid, 2 N-sodium carbonate solution and water. The solution is dried over sodium sulfate and evaporated to leave a residue of 3.1 grams of neutral product X in the form of a colorless resin.

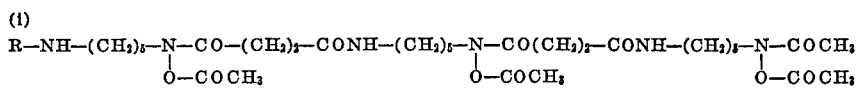

A solution of 280 mg. of product XII in 30 cc. of 0.1 N-sodium hydroxide solution is treated with 350 mg. of benzoyl chloride and the whole is agitated for 1½ hours at 0° C. The mixture is extracted five times with chloroform, dried over sodium sulfate and evaporated, to yield (j)

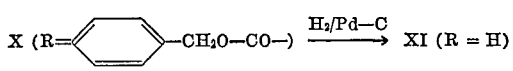

A solution of 3.0 grams of product X in 100 cc. of glacial acetic acid is hydrogenated in the presence of 300 mg. of palladium carbon of 10% strength at 22° C. When one molecular proportion of hydrogen has been taken up (after about ½ hour) the reaction is complete. Filtration and evaporation in vacuo yields 2.4 grams of product XI.

an oily residue which is precipitated with water from a methanolic solution (290 mg. of product XIII). For analysis the product is dried for 12 hours at 80° C. under a pressure of 0.001 mm. Hg over phosphorus pentoxide.

A solution of 280 mg. of product XII in 30 cc. of 0.1 N-sodium hydroxide solution is treated with 350 mg. of benzoyl chloride and the whole is agitated for 1½ hours at 0° C. The mixture is extracted five times with chloroform, dried over sodium sulfate and evaporated, to yield an oily residue which is precipitated with water (k)

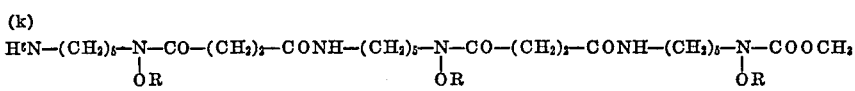

from a methanolic solution (290 mg. of product XIII). For analysis the product is dried for 12 hours at 80° C. under a pressure of 0.001 mm. Hg. over phosphorous pentoxide.

*Analysis.*—$C_{53}H_{64}O_{12}N_6$. Calculated: C, 65.14%; H, 6.60%. Found: C, 65.40%; H, 6.55%.

(m)

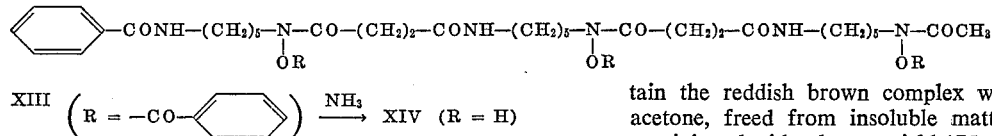

A solution of 275 mg. of product XIII in 25 cc. of methanolic ammonia saturated at 0° C. and the solution is kept for 16 hours, evaporated, and the residue is extracted four times with ether, whereupon product XIV (melting point 179–181° C.) insoluble in ether is recrystallized from methanol.

*Analysis.*—$C_{32}H_{52}O_9N_6$. Calculated: C, 57.81%; H, 7.88%; N, 12.66%. Found: C, 57.61%; H, 8.10%; N, 12.45%.

According to its melting point and mixed melting point the product so obtained is identical with the corresponding hydrolysate obtained from the O:O':O"N-tetrabenzoyl derivative of ferrioxamine B.

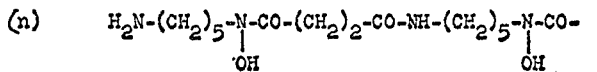

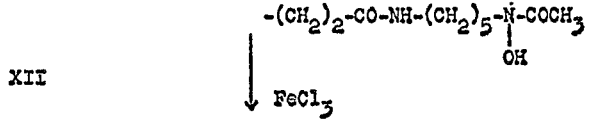

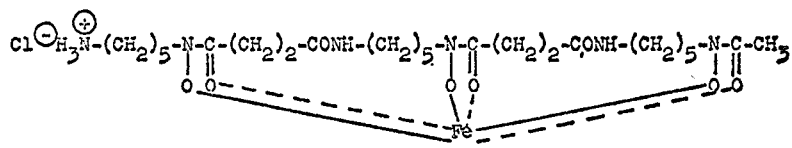

500 mg. of product XII are taken up in 100 cc. of water and treated with 400 mg. of ferric chloride containing water of crystallization ($FeCl_3 \cdot 6H_2O$) in 20 cc. of water, whereupon the coloration typical of ferrioxamine appears spontaneously. The whole is allowed to stand for 15 minutes and then agitated three times with 20 cc. of a 1:1-mixture of chloroform and phenol on each occasion. The extracts are washed with a little amount of water and treated with 200 cc. of diethyl ether, whereupon ferrioxamine B hydrochloride (XIII) forms an amorphous, reddish brown precipitate. The product is repeatedly washed with ether; in the following properties it corresponds to authentic material: Absorption spectra in the ultra-violet, visible and infra-red ranges; paperchromatogram, electrophoresis, antagonism test with ferrimycins and the N - (2:4 - dinitrophenyl) derivative [see (o)].

(o)

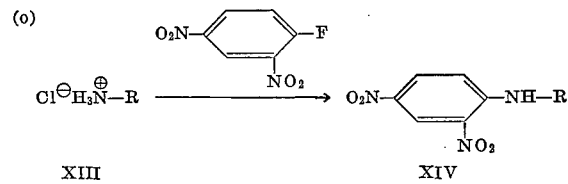

A solution of 225 mg. of product XIII and 225 mg. of sodium bicarbonate in 15 cc. of water is treated with 225 mg. of 2:4 - dinitrofluorobenzene in 15 cc. of ethanol and the mixture is kept for 5 hours at 23° C. The ethanol is then distilled off under reduced pressure, the aqueous phase is extracted twice with 30 cc. of diethyl ether on each occasion and then four times with 30 cc. of n-butanol on each occasion. The butanol extracts are washed with water and evaporated in vacuo; they contain the reddish brown complex which is taken up in acetone, freed from insoluble matter by filtration and precipitated with ether, to yield 175 mg. of an amorphous, orange powder XIV. For analytical purposes the product is reprecipitated three times and then dried at 70° C. under 0.01 mm. Hg over phosphorus pentoxide.

*Analysis.*—$C_{31}H_{47}O_{12}N_8Fe$. Calculated: C, 47.76%; H, 6.08%; N, 14.38%; Fe, 7.16%. Found: C, 43.31%; H, 6.38%; N, 13.93%; Fe, 7.02%.

Its ultra-violet absorption spectrum likewise reveals product XIV to be identical with the analogous derivative of ferrioxamine B.

EXAMPLE 19

(In this example, the products identified with Roman numerals are identical with those represented by formulae in Example 1.)

(a)      *I→II*

4.5 grams of carbobenzoxy chloride and a solution of 2 grams of potassium hydroxide in 10 cc. of water are added dropwise while stirring at 0° C. to a mixture of 4.1 g. of 1-amino-5-nitropentane hydrochloride, 20 cc. of water and 1.43 grams of potassium hydroxide. Stirring is continued for 10 minutes, the mixture acidified slightly with hydrochloric acid, and extracted with chloroform. The chloroformic extract is washed with sodium bicarbonate solution, dried over sodium sulfate, and evaporated under reduced pressure. The residue is crystallized from a mixture of diethyl ether and petroleum ether to obtain 1-carbobenzoxyamino-5-nitropentane (II) of melting point 52–53° C. The yield is 85%.

(b)      *II→III*

A solution of 2 grams of compound II in 40 cc. of ethanol is treated with a solution of 3 grams of ammonium chloride in 30 cc. of water and 10 drops of concentrated aqueous ammonia, and in the course of 5–10 minutes 1.5 grams of zinc dust are added with stirring. Stirring is continued for 15 minutes, care being taken that the temperature does not exceed 30° C. The reaction mixture is then filtered through Celite, the filtrate evaporated under reduced pressure, the residue dissolved in 50 cc. of 2 N-hydrochloric acid, and the solution extracted by agitating it with ether. The aqueous phase is alkalinized with aqueous ammonia, extracted with chloroform, and the chloroformic extract dried and evaporated. When the residue is terated with ether, the resulting 1-carbobenzoxyamino - 5 - hydroxylamino-pentane (III) crystallizes; melting point 102–104° C. Its hydrochloride melts at 83–85° C.; yield, 71%.

(h)

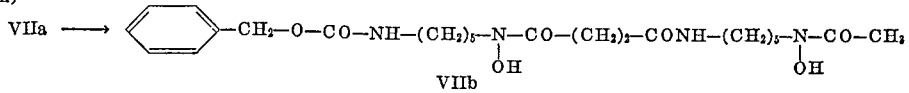

(c)  III→IV

A mixture of 1.85 g. of compound III, 20 cc. of pyridine, and 1.1 grams of succinic anhydride is heated at 85° C. for an hour and a half, the pyridine then evaporated under reduced pressure, and the residue taken up in chloroform. The chloroformic solution is shaken with potassium bicarbonate solution, the latter is acidified slightly, with hydrochloric acid, and extracted four times with ethyl acetate. The extract is dried and evaporated, and 1-carbobenzoxyamino-5-(N-succinyl-hydroxylamino)-pentane (IV) obtained which, after being redissolved in ethyl acetate+methanol melts at 115° C. The yield is 70%.

(d)  IV→V

A mixture of 2.865 grams of compound IV, 1.88 grams of dicyclohexyl-carbodiimide, and 50 cc. of absolute tetrahydrofuran is allowed to stand at room temperature for 2 days, the precipitated dicyclohexyl urea is filtered off and the filtrate evaporated in vacuo. The residue is taken up in ethyl acetate, and the solution allowed to stand in a refrigerator. The small quantity of dicyclohexyl urea which precipitates is filtered off, and the filtrate treated with ether after which the resulting N-(5'-carbobenzoxyaminopentyl) - tetrahydro - 3,6 - dioxo - 1,2 - oxazine (V) separates in the form of colorless needles; melting point, 84–85° C.; yield 70%. When the reactions described under (a)–(d) are performed without separation and purification of the intermediate products, the substance V is obtained in a total yield of 51%.

(e)  V→VI

A solution of 1.2 grams of compound V and 1 gram of 1-amino-5-nitro-pentane hydrochloride in absolute methanol is treated with a solution of 0.32 gram of sodium methylate in methanol. The mixture is heated at about 50° C. for half an hour, and the precipitated sodium chloride then filtered off, and the filtrate evaporated under reduced pressure. The residue is crystallized from methanol+ethyl acetate to obtain 1-carbobenzoxyamino-5-[N-(5' - nitropentyl - amino - succinyl)-hydroxylamino]-pentane (VI) of melting point 114–116° C.; yield, 88%.

(f)  VI→VII

A solution of 0.85 gram of compond VI in 20 cc. of ethanol is stirred while being treated with 15 cc. of an ammonium chloride solution of 10% strength, which had been alkalinized with a few drops of aqueous ammonia, and with 0.5 g. of zinc dust. Stirring is continued for 20 minutes, the solution filtered, and the filtrate evaporated under reduced pressure. The residue is taken up in ethanol, filtered again, and the filtrate evaporated to dryness. The resulting 1-carbobenzoxyamino-5[N-(5'-hydroxylamino - pentylaminosuccinyl)-hydroxylamino]-pentane (VII) can be used without being purified.

(g)

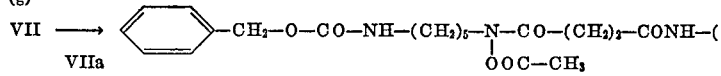

The residue obtained according to (f) is dissolved in 10 cc. of absolute pyridine and 2 cc. of acetic anhydride, and the solution allowed to stand at room temperature for 1 day. The reaction mixture is then evaporated under vacuum, the residue taken up in chloroform, the solution washed with dilute hydrochloric acid and sodium bicarbonate solution, then chromatographed on silica gel. Elution is performed with ethyl acetate+methanol 10:1, and the triacetyl compound VIIa obtained in a yield of 49% when the eluate is evaporated. NMR bands at 2.2 p.p.m. (twice O-acetyl) and 1.95 p.p.m. (once N-acetyl).

A mixture of 0.15 gram of compound VIIa and 10 cc. of N-potassium hydroxide solution is allowed to stand at room temperature for 1 day, then neutralized with dilute hydrochloric acid, and evaporated under reduced pressure. The residue is taken up in warm ethyl acetate +methanol, the solution dried, concentrated and cooled, after which compound VIIb crystallizes. Melting point 165° C.; NMR bands at 1.95 p.p.m. (N-acetyl; yield, 79%).

When the reaction steps described under (e–h) are performed without purification and without isolation of the intermediate products, product VIIb is obtained in a total yield of 49%.

(i)

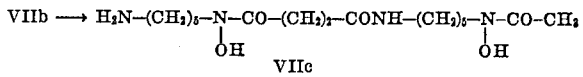

0.5 gram of compound VIIb is dissolved in 50 cc. of ethyl acetate, 0.5 gram of palladium carbon added, and the mixture shaken in an atmosphere of hydrogen until the absorption of hydrogen ceases. The catalyst is then filtered off, the filtrate acidified slightly with methanolic hydrochloric acid, and evaporated under reduced pressure. The residue can be used without being further purified.

(k)  VIIc.HCl+V→IX→XII

A methanolic solution of equimolecular quantities of the hydrochloride of compound VIIc contained in the above residue, N-(5'-carbobenzoxyamino-pentyl)-tetrahydro-3,6-dioxo-1,2-oxazine, and sodium methylate is worked up as shown under (e). It is then evaporated and the colorless residue taken up in ethyl acetate and chromatographed on silica gel. Elution is performed with a 1:1 mixture of ethyl acetate and methanol, and the main fraction subjected to hydrogenolysis as described under (i). The solution is freed from the catalyst and evaporated.

(l)  XII→XIII

The residue obtained according to (k) is taken up in water, the solution filtered through Celite to obtain a clear filtrate which is then treated with a ferric chloride solution, and the red-brown mixture allowed to stand for 1 hour before it is extracted three times with a 1:1 mixture of chloroform and phenol. The extracts are combined and washed with a small quantity of water, treated with diethyl ether, the resulting red-brown precipitate filtered off and washed with diethyl ether. The ferrioxamine-B-hydrochloride XIII so obtained is identical with authentic material. The total yield of stages i—1 is about 50%.

EXAMPLE 20

650 mg. of ferrioxamine B hydrochloride and 82 mg. of anhydrous sodium acetate are dissolved in 10 cc. of methyl alcohol, and 9.5 cc. of acetic anhydride are added.

After being allowed to stand for 4 hours at room temperature, the reaction mixture is evaporated to dryness in vacuo. The residue is dissolved in water and saturated with sodium chloride. The reaction solution is then extracted four times with chloroform. The chloroform extracts are washed twice with saturated sodium chloride solution, dried with sodium sulfate and evaporated in vacuo. There are obtained 550 mg. of a red-brown powder which in a paper chromatogram in two systems shows the same behaviour as ferrioxamine $D_1$, but is accompanied by small quantities of two by-products of which one migrates somewhat farther than ferrioxamine $D_1$ and the other not quite so far.

For the purpose of purification the acetylation product is chromatographed on a column of 280 grams of cellulose powder. The cellulose is first moistened with an aqueous sodium chloride solution of 10% strength. As eluant there is used the upper phase of a mixture of 50 parts of teritary butanol, 25 parts of water, 25 parts of saturated sodium chloride solution and 1 part of 0.1 N-hydrochloric acid. Fractions of about 8 cc. are collected. Fractions 33–44 contain, in addition to ferrioxamine $D_1$, one impurity, and fractions 55–66 the other. Fractions 45–56 contain pure ferrioxamine $D_1$. They are evaporated to dryness in vacuo, the residue taken up in chloroform, and washed several times with saturated sodium chloride solution. The solution dried with sodium sulfate is evaporated to leave behind 226 mg. of an acetylation product which crystallizes from a mixture of methanol and ether in small red-brown needles. With a heatable polarization microscope the needles are observed to lose their double refraction at 170–172° C. and liquefy at about 197–205° C. to form a tough red-brown mass. Ferrioxamine $D_1$ which is obtained directly from *Streptomyces pilosus* extracts according to our aforementioned patent application behaves identically. A mixture of the two products shows no depression of the melting point. The infrared absorption spectra are identical. The acetylation product purified by crystallization is unitary when examined paperchromatographically and behaves like ferrioxamine $D_1$.

EXAMPLE 21

A solution of 120 mg. of ferrioxamine-G-hydrochloride in 1 cc. of water and 35 cc. of dimethyl formamide is added dropwise to a mixture of 10 grams of dicyclohexyl-carbodiimide in 25 cc. of dimethyl formamide, and the reaction mixture then allowed to stand at room temperature for 3 weeks. The dimethyl formamide is evaporated to a great extent under vacuum, the residue treated with 20 cc. of N-acetic acid while cooling with ice, and then allowed to stand overnight. The precipitated dicyclohexyl urea is filtered off with suction, and the filtrate evaporated under reduced pressure. The filtered dicyclohexyl urea still has a somewhat reddish coloration and is therefore recrystallized from ethanol. The reddish mother liquors are evaporated and the two evaporation residues combined. They are subjected to a distribution according to Craig: n-butanol: benzyl alcohol:0.001 N-hydrochloric acid: saturated sodium chloride 2:1:3:0.6 in 37 stages. The red substances are in the fractions 15–24:ferrioxamine E and 28–33:acetyl-ferrioxamine G.

Fractions 15–24 are combined and treated with diethyl ether to force the ferrioxamine E completely into the aqueous phase. The aqueous phase is treated with sodium chloride solution of about 20% strength, extracted with chloroform+phenol (1 cc.:1 g.) three times, and the extract rendered clear by filtration through a short column of Celite. The filtrate is treated with twice its volume of diethyl ether, extracted three times with a small quantity of water, the aqueous phases washed twice with ether, and then evaporated to dryness under reduced pressure. There remain 15 mg. of a red-brown amorphous powder which is crystallized from about 1 cc. of hot methanol. Ferrioxamine E is obtained in the form of red-brown needles which lose their double refraction at 280° C. and turn black without melting (same as the authentic material).

From fractions 28–33 there are obtained on working up in the same manner 100 mg. of crude N-acetyl-ferrioxamine G which has formed from unreacted starting material during the decomposition of the reaction mixture with acetic acid.

EXAMPLE 22

A solution of 25 grams of ferrioxamine B-hydrochloride in 500 cc. of methanol is mixed with a solution of 50 grams of pure 8-hydroxyquinoline (twice recrystallized from aqueous ethanol) in 500 cc. of methanol. The mixture is kept for 4 to 5 hours at room temperature. The solution turns black and crystalline iron-hydroxyquinoline settles out; the whole is filtered through a glass suction filter (G4), rinsed with a small amount of methanol, and the blackish filtrate is evaporated under vacuum to dryness at 30 to 38° C. The residue is suspended in 300 cc. of water and agitated 5 to 6 times with 300 cc. of chloroform on each occasion, whereby blackish matter is transferred into the organic phase. The chloroform extracts are run through two separating funnels with 100 cc. of water and are then discarded. The aqueous phases, which are now of yellow color and free from hydroxyquinoline, are combined and evaporated to dryness at 40° C. under vacuum in a rotary evaporator. The crystalline, yellowish evaporation residue is recrystallized twice from water+methanol+acetone in the following manner:

1 gram of the substance is dissolved with heating in 5 cc. of methanol of 80% strength and rapidly mixed with 15 cc. of warm acetone. The slow crystallization takes 24 hours at room temperature, after which time the product is still faintly yellowish. A batch of 25 grams yields after two recrystallizations 18–19 grams of 30-methyl - 7:18:29 - trihydroxy-8:11:19:22:30-pentaoxo-1:7:12:18:23:29-hexaaza-triacontane hydrochloride.

EXAMPLE 23

A solution of 300 mg. of ferrioxamine B-hydrochloride in 10 cc. of water is mixed with 20 cc. of N-sodium hydroxide solution and the precipitated ferric hydroxide is centrifuged off. The filtrate is immediately neutralized with N-hydrochloric acid. The resulting, substantially colorless solution is repeatedly agitated with n-butanol and the combined extracts are washed with a small amount of water. The butanol is evaporated under vacuum and there is obtained a crystalline yellowish residue which is purified as described in Example 22. The final product is identical with the substance obtained as described in Example 22.

EXAMPLE 24

11.94 grams of 30-methyl-7:8:29-trihydroxy-8:11:19: 22:30-pentaoxo-1:7:12:18:23:29-hexaaza-triacontane hydrochloride and 1.64 grams of anhydrous sodium acetate are dissolved in 200 cc. of methanol by being boiled for a short time. The whole is then rapidly cooled to room temperature and treated immediately—that is to say before crystallization sets in—with 180 cc. of acetic anhydride. The mixture is kept for 17 hours with exclusion of moisture and then concentrated under vacuum to form an oily residue which is freed from acetic acid by being evaporated under vacuum with 2× about 200 cc. of butanol. The oily residue, which consists mainly of the tetraacetyl derivative is taken up in 200 cc. of methanol, saturated at 0° C. with ammonia, and then kept for 5 hours at room temperature and finally for 15 hours at 0° C. The resulting colorless crystallizate is freed from the ammoniacal solution by decantation and drying under vacuum; yield: 11.74 grams. After two recrystallizations from aqueous methanol of 60% strength there are obtained 9.12 grams of 1-acetyl-30-methyl-7:18:29-trihydroxy - 8:11:19:22:30-pentaoxo-1:7:12:18:23:29-hexa-aza-triacontane which is identical with the product described in Example 8 insofar as its melting point, mixed melting point, infrared spectrum, color reactions, microanalysis and paper-chromatography are concerned.

EXAMPLE 25

A solution of 257 mg. of ferrioxamine $D_1$ in 20 cc. of water is treated with about 200 cc. of N-sodium hydroxide solution. The finely floccular iron hydroxide is removed in a centrifuge and the solution is rendered weakly acid with 2 N-hydrochloric acid. The solution is agitated three times with n-butanol and the extracts are washed with a small amount of water. After having evaporated the butanol under vacuum 1-acetyl-30-methyl-7:18:29-trihydroxy - 8:11:19:22:30 - pentaoxo - 1:7:12:18:23:29-hexaaza-triacontane as a crystalline residue which is recrystallized from much hot methanol to yield 170 mg. (=72% of theory) of a white, finely crystalline powder melting at 185° C.

The $R_f$-value in n-butanol+glacial acetic acid+water (4:1:1) is 0.87 (the chromatogram is sprinkled with a 1% alcoholic solution of ferric chloride to render the substance visible).

EXAMPLE 26

A solution of 200 mg. of ferrioxamine $D_1$ in 20 cc. of 6 N-hydrochloric acid is continuously extracted with ether for 2–3 hours. The aqueous solution, which by then has become colorless, is adjusted with sodium hydroxide solution to a pH value of about 4 to 5 and repeatedly agitated with n-butanol. When the butanol extracts are washed with water, evaporated and the residue is recrystallized from methanol, 1-acetyl-30-methyl-7:18:29-trihydroxy-8:11:19:22:30-pentaoxo-1:7:12:18:23:29 - hexaaza - triacontane formed is obtained as described in Example 8. Its properties are identical with those of the product described in Example 8.

EXAMPLE 27

100 mg. of N-acetyl-ferrioxamine G are dissolved in 3 cc. of water and treated with N-sodium hydroxide solution. The precipitated ferric hydroxide is separated in a centrifuge and the solution acidified with hydrochloric acid. The reaction mixture is extracted with butanol and the butanol solution evaporated under reduced pressure to yield 1-acetyl-30-($\beta$-carboxyethyl)-7:18:29-trihydroxy-8:11:19:22:30 - pentaoxo - 1:7:12:18:23:29 - hexaaza-triacontane as an almost colorless, crystalline residue. After being recrystallized four times from methanol the very fine crystalline powder melts at 169–170° C.

The starting material may be obtained as follows:

750 liters of the active culture bouillon of *Streptomyces pilosus* A 21748 (NRRL 2857) obtained as described in Example 1 are treated with 750 grams of ferric sulfate in 7.5 liters of water and 15 kilos of Hyflo Supercel, and then filtered. The red-brown culture filtrate of 730 liters (pH 4.0) is treated with 131 kilos of sodium chloride and extracted in a ratio of approximately 20:1 with a mixture of phenol and chloroform (1 part by weight of phenol, 1 part by volume of chloroform). The 40 liters of the intensely red-brown extract are dried over anhydrous sodium sulfate and the dry extract introduced in the course of 60 minutes into a suspension consisting of 40 liters of ether, 200 liters of petroleum ether and 4 kilos of Hyflo Supercel. The filter cake is digested once with 25 liters of ether and twice with 25 liters of ether and acetone (3:1, vol.:vol.) to remove the phenol. The Hyflo adsorbate is then digested seven times with 15 liters of methanol for ½ hour at room temperature each time. The dark red to orange colored extracts are combined and concentrated to 1 liter at a maximum temperature of 25° C. The concentrate is introduced with stirring into a suspension of 4 liters of ether, 4 liters of petroleum ether and 600 grams of Hyflo Supercel. The suspension is filtered with suction, the filter cake washed free from phenol with ether and a mixture of ether and acetone and the Hyflo adsorbate again eluted with methanol. The methanol eluate is then evaporated to dryness in a rotary evaporotor at a maximum temperature of 25° C. The yield of foamy, red-brown dry product is 369 grams.

The two filtrates obtained by precipitating the substances with mixtures of ether and petroleum ether on to Hyflo Supercel and subsequent filtration are extracted with a little water to obtain the material still dissolved therein (it is more particularly the more lipophilic ferrioxamines that are concentrated). The aqueous extracts are saturated to two-thirds with sodium chloride, extracted with a small amount of a mixture of phenol and chloroform and processed as described above. The yield is 20 grams of a red, greasy substance. The latter is processed together with the above product.

13 liters of Dowex 50–WX2 (sulfonated polystyrene, cross-linked with 2% of divinylbenzene), 100/200 mesh in the $NH_4^+$ form are conditioned while being cooled with water (12–14° C.) in a glass column of 10 cm. internal diameter (resin height 170 cm.) for 24 hours with 0.1-molar ammonium acetate buffer of pH 4.5 at a perfusion rate of 3.0 liters per hour.

389 grams of crude ferrioxamine mixture are introduced in the course of 1 hour with stirring into 3.5 liters of 0.1-molar ammonium acetate buffer. The turbid mixture is filtered through a glass frit G4. The residue is stirred twice for one hour each time with 500 cc. of fresh buffer. About 10% remains undissolved. The conditioned resin is cautiously covered with the dark red solution. The solution is allowed to trickle in at the rate of 1.5 liters per hour and is rinsed with 5 liters of 0.1-molar buffer in portions. The chromatogram is then developed for 86 hours at a rate of 1.5 liters per hour with 0.1-molar buffer and then for 18 hours at a rate of 3 liters per hour with 0.3-molar buffer. Ferrioxamine G is enriched in fraction I (100–140 liters). Fraction II (140–180 liters) contains chiefly ferrioxamine B. The eluates from the fraction volumes of 100–140 liters are combined. Working up is performed by partial saturation with sodium chloride. Extraction with a mixture of phenol and chloroform, removal of the ammonium acetate buffer by washing the extract with an 0.01 N-hydrochloric acid which contains 10% of sodium chloride, precipitation with ether and petroleum ether in the presence of Hyflo Supercel, extraction with methanol and evaporation of the solution as described above yield 7.9 grams of substance enriched in ferrioxamine G.

4 grams of the substance obtained from fraction I are dissolved in 25 cc. of 0.1-molar ammonium acetate buffer (pH 4.6–4.7) and poured on to a column of Dowex 50–WX2 (100/200 mesh) in the ammonium salt form; dimensions of the column; 3 cm. diameter, 57 cm. height. On elution with ammonium acetate buffer the brown dyestuff is separated into two zones. The first zone is eluted with 0.1-molar ammonium acetate buffer and the second with 0.3-molar ammonium acetate buffer.

The eluates are worked up separately by being treated with approximately 20% of sodium chloride and extraction with a mixture of phenol and chloroform (1 kilo of phenol to 1 liter of chloroform). The extracts are washed three times with 0.01 N-hydrochloric acid containing sodium chloride and filtered through a small Celite column to give a clear solution.

After being diluted with an equivalent volume of ether the active substance is again taken up in water; the aqueous solutions are washed twice with ether and then evaporated to dryness under reduced pressure. Two ferrioxamine hydrochlorides are obtained in the form of amorphous red-brown powder.

The first zone yields 2.28 grams of ferrioxamine G hydrochloride, the second 0.92 gram of ferrioxamine B hydrochloride. The latter can be identified by paperchromatography of the hydrochloride and the N-acetyl derivative (ferrioxamine $D_1$).

535 mg. of ferrioxamine G hydrochloride are dissolved in 10 cc. of methanol; 100 mg. of anhydrous sodium acetate and 9 cc. of acetic anhydride are added and the whole allowed to stand for 4 hours. The reaction mixture is evaporated to dryness under reduced pressure, the residue taken up in water and the solution saturated with sodium chloride. On being extracted several times with chloroform the bulk of the brown pigment (acetylation product) passes into the organic phase. Small quantities of starting material and degradation products remain dissolved in the water.

The chloroform extracts are washed twice with sodium chloride solution, dried over sodium sulfate and evaporated under reduced pressure to yield 483 mg. of amorphous brown residue.

On recrystallization from a mixture of methanol and ether amorphous flakes precipitate at first. After these have been separated off, the mother liquors, on the further addition of ether, yield N-acetyl-ferrioxamine G in the form of fine, red-brown prisms melting at 201–206° C. (microscope). Double refraction remains until the product melts, whereas in the case of the similarly melting ferrioxamine $D_1$ it disappears at about 170° C. Altogether, 250 mg. of crystalline acetylation product are obtained.

EXAMPLE 28

1-acetyl-30-($\beta$ - carbomethoxy - ethyl) - 7:18:29-trihydroxy - 8:11:19:22:30 - pentaoxo-1:7:12:18:23:29-hexaaza-triacontane may be prepared by reacting N-acetyl-ferrioxamine G methyl ester with sodium hydroxide solution in a manner analogous to that described in Example 23 or 25.

The starting material may be obtained, for example, as follows:

67 mg. of N-acetyl-ferrioxamine G are dissolved in 5 cc. of methyl alcohol and 2 cc. of an ethereal solution of diazomethane of about 2% strength are added. After 30 minutes the reaction mixture is evaporated under reduced pressure and the residue recrystallized from a mixture of methanol and ether. The resulting N-acetyl-ferrioxamine G-methyl ester melts at 194–199° C.

EXAMPLE 29

11.94 grams of 30-methyl-7:18:29-trihydroxy-8:11:-19:22:30 - pentaoxo - 1:7:12:18:23:29 - hexaaza - triacontane hydrochloride are suspended in 200 cc. of water. The mixture is then adjusted to pH 9 with sodium hydroxide solution and with portions of 2.4 cc. of N-valeric acid chloride while being strongly agitated and stirred with a vibromixer. Simultaneously the mixture is maintained at pH 9 by the dropwise addition of 5 N-sodium hydroxide solution. After the addition of the first two portions of the acid chloride an oily product precipitates from the powdery suspension. 200 cc. of chloroform are added, the mixture separating into 2 clear phases which are intensively mixed during the further reaction. After the addition of a total of 16 cc. of N-valeric acid chloride and a total of approximately 38 cc. of 5 N-sodium hydroxide solution, the reaction mixture is stirred for another 15 minutes. The phases are then separated. The aqueous phase is extracted with 3 × 200 cc. of chloroform. The combined chloroform phases are washed with saturated potassium bicarbonate and with saturated sodium chloride solution, dried over sodium sulfate and evaporated to a syrup under reduced pressure. The oily residue (29 grams) is taken up in 500 cc. of methanol, the solution saturated at 0° C. with ammonia gas and then allowed to stand for 16 hours at 25° C. The reaction mixture is then evaporated to dryness and thoroughly dried in a high vacuum. The crystalline residue (16.4 grams) is boiled in acetone, the mixture allowed to stand for 15 hours at 0° C. and then filtered. The separated white crystalline powder is recrystallized from a mixture of 150 cc. of water and 70 cc. of n-propanol at 100° C. to yield 1-valeryl-30-methyl-7:18:29-trihydroxy - 8:11;19:22:30 - pentaoxo - 1:7:12:18:23:29- hexaaza-triacontane as a colorless crystallizate melting at 181–183° C.

In contrast to the starting material, the resulting compound is difficultly soluble even in hot water. It does not dissolve readily in most of the ordinary organic solvents either, but can be dissolved in mixtures of water and organic solvents with heating.

EXAMPLE 30

5.97 grams of 30-methyl-7:18:29-trihydroxy-8:11:19: 22:30-pentaoxo-1:7:12:18:23:29 - hexaaza - triacontane hydrochloride are suspended in 40 cc. of water and 50 cc. of dioxane; the suspension is adjusted to pH 9 with 5 N-sodium hydroxide solution with strong agitation in the vibromixer and then treated with 10 cc. portions of a solution of 18.18 grams of stearic acid chloride in 60 cc. of dioxane. The pH of the mixture is maintained at 9 by the dropwise addition of 5 N-sodium hydroxide solution. After the addition of 4 portions of stearic acid chloride solution, the reaction mixture is treated with 50 cc. of water and 200 cc. of chloroform. The mixture separates into two clear phases which are intensively mixed for the further reaction by being strongly agitated in the vibromixer. After completion of the addition of the acid chloride, the reaction mixture is stirred for another hour at pH 9. It is then diluted by the addition of 500 cc. of water and 1 liter of chloroform, the phases separated and the aqueous phase extracted twice with 250 cc. of chloroform each time. The combined chloroform phases are washed with saturated potassium bicarbonate and sodium chloride solutions, dried over sodium sulfate and evaporated. The crystalline residue is dissolved in 500 cc. of ether, the solution treated with 200 cc. of methanol and saturated at room temperature with ammonia gas. After being allowed to stand for 3 days at room temperature the reaction mixture is evaporated to dryness under reduced pressure and the residue boiled several times with petroleum ether to remove stearic acid amide. The remaining colorless crystalline powder (4.3 grams) is recrystallized from aqueous n-propanol of 66% strength. The resulting 1-stearyl-30-methyl - 7:18:29 - trihydroxy-8:11:19:22:30-pentaoxo - 1:7:12:18:23:29 - hexaaza-triacontane melts at 194–196° C. It is sparingly soluble in water and the ordinary organic solvents.

In an analogous manner by reaction with the appropriate acid chlorides or acid anhydrides 1-$R_1$-30-methyl-7: 18:29-trihydroxy-8:11:19:22:30 - pentaoxo - 1:7:12:18: 23:29 - hexaaza - triacontane may be prepared in which $R_1$ represents the formyl, propionyl, n-butyryl, oleyl, succinyl, glutaryl, salicyl, p-hydroxybenzoyl or p-aminosalicyl radical or the radical of the formula

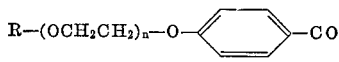

in which R stands for methyl or ethyl and $n$ is a number from 1 to 9.

EXAMPLE 31

(a) 3.0 grams of 2 - (5 - carbobenzoxy - aminopentyl)-3:6-dioxo-tetrahydro - 1:2 - oxazine are heated for 15 minutes on a water-bath with 1 ml. of anhydrous triethylamine in 50 ml. of absolute methanol. The reaction mixture is evaporated in vacuo and the residue dissolved in chloroform and washed with dilute hydrochloric acid and sodium bicarbonate solution. The product, which remains on evaporation of the chloroform, is recrystallized from a mixture of ethyl acetate and ether to yield 2.9 grams (82%) of 1- carbobenzoxy-amino-5-(N-succinyl-hydroxyl-amino)-pentane methyl ester melting at 75–76° C.

(b) 2.5 grams of the above carbobenzoxy derivative are hydrogenated for 3½ hours in 75 ml. of methanol with 500 mg. of a palladium carbon catalyst of 10% strength in a current of hydrogen. 1 equivalent of hydrogen chloride in dry methanol is added in 4 portions in the course of hydrogenation. The solution filtered off from the catalyst is cautiously concentrated and ether is added.

There are obtained 1.68 grams (93%) of 1-amino-5-(N-succinyl-hydroxylamino)-pentane methyl ester hydrochloride in the form of lustrous crystals which are recrystallized from a mixture of methanol and ether for the purpose of analysis; M.P. 102–103° C.

(c) 1.5 grams of the hydrochloride of the above amino compound are treated with 0.35 gram of sodium methoxide in a little methanol. The solution separated from the precipitated sodium chloride is evaporated in vacuo. The residue is dissolved in absolute tetrahydrofuran and heated with 2.0 grams of 2-(5-carbobenzoxy-aminopentyl)-3:6-dioxo-tetrahydro-1:2-oxazine for 15 minutes on a waterbath. After evaporation of the solvent, the resinous residue is crystallized from ethyl acetate and recrystallized from a mixture of methanol and ethyl acetate to yield 2.215 grams (67%) of 1-carbobenzoxy-amino-6:17-dihydroxy-7:10:18-trioxo-20 - carbomethoxy-6:11:17-triaza-eikosan; M.P. 129–131° C.

(d) 1.7 grams of the carbobenzoxy derivative described in (c) are decarbobenzoxylated in the conventional manner by catalytical hydrogenation in 200 ml. of methanol with the addition of methanolic hydrochloric acid. The solution is separated from the catalyst, concentrated and treated with ether to yield 1.37 grams (97%) of fine crystals which are 1-amino-6:17-dihydroxy-7:10:18-trioxo-20-carbomethoxy-6:11:17-triaza - eikosan hydrochloride. The product is recrystallized from a mixture of methanol and ether; M.P. 131–133° C.

(e) 1.1 grams of the hydrochloride of the amino compound described in (d) are heated for 15 minutes on a water-bath with 0.125 gram of sodium methoxide and 0.80 gram of 2-(5-carbobenzoxy-aminopentyl)-3:6-dioxo-tetrahydro-1:2-oxazine in 20 ml. of absolute methanol. The sparingly soluble 1-carbobenzoxy-amino-6:17:28-trihydroxy-7:10:18:21:29-pentaoxo - 31 - carbomethoxy-6:11:17:22:28-pentaza-hen-triakontan crystallizes out of the reaction mixture and is recrystallized first from aqueous methanol and then from methanol. Yield: 0.75 gram (42%); M.P. 163–165° C.

(f) By catalytical decarbobenzoxylation there is obtained from 0.60 gram of the carbobenzoxy derivative described in (e) 0.465 gram (89%) of a product melting unsharply at 135–140° C. after precipitation from a mixture of methanol and ether. It is 1-amino-6:17:28-trihydroxy - 7:10:18:21:29-pentaoxo - 31-carbomethoxy-6:11:17:22:28-pentaza-hentriakontan hydrochloride.

(g) 0.30 gram of the hydrochloride described in (f) is acetylated for 24 hours with acetic anhydride and pyridine in the cold. The yellowish product, which is obtained after working up in the customary manner, is chromatographed on 50 times its quantity of silica gel. The fractions eluted with a mixture of chloroform and methanol (19:1), which are unitary in the thin-layer chromatograph, are allowed to stand overnight in a refrigerator in 10 ml. of methanol with 5 ml. of saturated potassium bicarbonate solution. On acidification and evaporation in vacuo, crystalline 30-(β-carboxyethyl) - 7:18:29 - trihydroxy - 8:11:14:22:30 - pentaoxo-1:7:12:18:23:29-hexaaza-triacontan of the formula

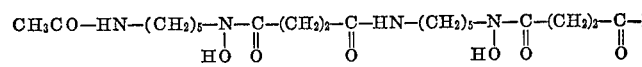

precipitates. For the purpose of analysis the product is recrystallized from methanol; M.P. 185° C.

(h) 0.10 gram of the above hydrochloride is allowed to stand for three days with 2 ml. of 2 N-potassium hydroxide solution, acidified, treated with ferric chloride, buffered with sodium acetate and the ferric complex extracted with a mixture of phenol and chloroform (1:1). The extracts are washed several times with saturated sodium chloride solution and 0.01 N-hydrochloric acid and dried with sodium sulphate. The ferric complex is driven into the aqueous layer by the addition of ether, the aqueous layer is extracted with ether to remove the phenol and then evaporated in vacuo. The evaporation residue is dissolved in methanol and precipitated with ether. Yield: 77 mg. of an amorphous red-brown powder whose infrared absorption spectrum and paper-chromatographic behaviour are identical with those of authentic ferrioxamine G.

EXAMPLE 32

Dry vials (lyophilized)

1 vial contains:

| | Mg. |
|---|---|
| Desferrioxamine B-hydrochloride | 200 |
| Mannitol | 160 |
| | 383 |

A solution of 5 strength of the mixture is prepared, introduced into wide-necked vials and lyophyilized in the usual manner. Instead of the hydrochloride the sulfate or methane sulfonate can be used.

EXAMPLE 33

Dry vials (lyophilized)

1 vial contains:

| | Mg. |
|---|---|
| Desferrioxamine $D_1$ | 180 |

Preparation as described in Example 32.

EXAMPLE 34

Desferrioxamine E is sterilized and then charged through ethylene oxide in the dry state under sterile conditions into ampoules or vials (200 mg. each). For use the preparation is dissolved or suspended in sterile, distilled water.

EXAMPLE 35

Suppositories are prepared from:

| | Mg. |
|---|---|
| Desferrioxamine B-hydrochloride | 300 |
| Suppository material for instance (cocoa butter, hydroxynated oils) | 1700 |
| | 2000 |

EXAMPLE 36

Capsules are prepared from:

| | Mg. |
|---|---|
| Desferrioxamine B-hydrochloride | 200 |
| Lactose | 10–50 |
| Talc | 5–30 |
| Magnesium stearate | 0.1–5 |

The mixture is filled into gelatine capsules.

EXAMPLE 37

Capsules are prepared from:

| | Mg. |
|---|---|
| Desferrioxamine B-hydrochloride | 250 |
| Lactose | 70 |
| Talc | 30 |
| | 350 |

Desferrioxamine B hydrochloride is intimately mixed with lactose and talc and passed through a sieve having a mesh of 1.0 mm. The powder mixture is then put in quantities of 350 mg. each into gelatine capsules (size 0) in apparatus suitable for this purpose, and the capsules sealed hermetically with a gelatine tape.

In analogous manner as described in Examples 32–37 preparations containing desferrioxamine $D_1$, G, N-acetyl-desferrioxamine G, N-formyl-desferrioxamine B, N-acetyl-desferrioxamine B, N-(n-valeryl)-desferrioxamine B, N-stearyl-desferrioxamine B, N-palmityl-desferrioxamine B, N-behenyl-desferrioxamine B, N-oleyl-desferrioxamine B, N-succinyl-desferrioxamine B, N-carbethoxy-desferrioxamine B, N-carbamido-desferrioxamine B, N-carbethylamide-desferrioxamine B, N-(p-ethoxyphenylacetyl)-desferrioxamine B, N-benzoyl-desferrioxamine B, N-(3,5-dihydroxybenzoyl)-desferrioxamine B, N-(2,4-dihydroxybenzoyl)-desferrioxamine B, N-(2,5-dihydroxybenzoyl)-desferrioxamine B, can be prepared.

What is claimed is:
1. A compound of the formula

I

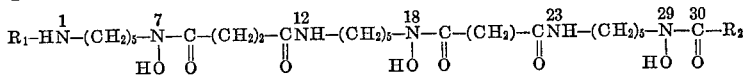

in which CO—$R_2$ represents carboxylic acid acyl and $R_1$ stands for a member selected from the group consisting of hydrogen, carboxylic acid acyl, m-dinitrophenyl and, together with CO—$R_2$, for succinyl in which the second carboxyl is combined with the $N_1$-atom to form a lactam, each of said carboxylic acid acyl groups being a member selected from the group consisting of alkanoyl, alkenoyl, succinyl, esterified succinyl, glutaryl, ethoxycarbonyl, amino-carbonyl, ethylamino-carbonyl, natural α-amino-carboxylic acid-acyl, benzoyl, salicyl, p-hydroxy-benzoyl, dihydroxy-benzoyl, p-ethoxy-benzoyl, p-ethoxy-ethoxy-benzoyl, p-ethoxy-ethyleneoxy-benzoyl, naphthoyl, phthaloyl, carbobenzoxy and phenylacetyl.

2. A therapeutically useful acid addition salt of a compound claimed in claim 1 in which $R_1$ is hydrogen.

3. A compound of the formula (I)

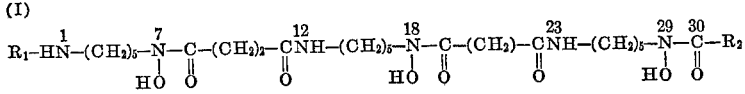

in which CO—$R_2$ represents a member selected from the group consisting of acetyl, free succinyl and etherified succinyl and $R_1$ stands for a member selected from the group consisting of hydrogen, carboxylic acid acyl, m-dinitrophenyl and, together with CO—$R_2$, for succinyl in which the second carboxyl is combined with the $N_1$-atom to form a lactam, each of said carboxylic acid acyl groups being a member selected from the group consisting of alkanoyl, alkenoyl, succinyl, esterified succinyl, glutaryl, ethoxycarbonyl, amino-carbonyl, ethylamino-carbonyl, natural α-amino-carboxylic acid-acyl, benzoyl, 482, 534, 439
salicyl, p-hydroxy-benzoyl, dihydroxy-benzoyl, p-ethoxy-benzoyl, p-ethoxy-ethoxy-benzoyl, p-ethoxy-ethleneoxy-benzoyl, naphthoyl, phthaloyl, carbobenzoxy and phenylacetyl.

4. The compound of claim 3, in which $R_1$ is hydrogen and $R_2$ is methyl.

5. The compound of claim 3, in which $R_1$ is acetyl and $R_2$ is methyl.

6. The compound of claim 3, in which $R_1$ is hydrogen and $R_2$ is β-carboxyethyl.

7. The compound of claim 3, in which $R_2$ is β-carboxyethyl the terminal carboxyl group of which is combined with the $N_1$-atom to form a lactam.

8. The compound of claim 3, in which $R_1$ is acetyl and $R_2$ is β-carboxyethyl.

9. The compound of claim 3, in which $R_1$ is acetyl and $R_2$ is β-carbomethoxyethyl.

10. The compound of claim 3, in which $R_1$ is hydrogen and $R_2$ is β-carbomethoxyethyl.

References Cited
UNITED STATES PATENTS
3,420,816   1/1969   Bodanszky _____ 260—239.3

HENRY R. JILES, Primary Examiner
R. T. BOND, Assistant Examiner

U.S. Cl. X.R.
71—94, 97, 106; 167—65; 260—404.5, 518, 471, 472, 482, 534, 439

CASE 4377/78/4505/4630
4806/4832/4906/
5109

PO-1050
(5/69)

UNITED STATES PATENT OFFICE
CERTIFICATE OF CORRECTION

Patent No. 3,471,476      Dated October 7, 1969

Inventor(s) ERNST GAEUMANN (DECEASED) By TINO GAEUMANN ET AL

It is certified that error appears in the above-identified patent and that said Letters Patent are hereby corrected as shown below:

Column 49, the formula in claims 1 and 3 should read:

I

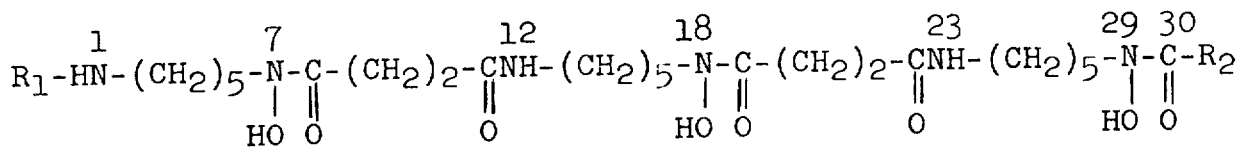

Column 50, line 12, delete "482,534,439".

SIGNED AND
SEALED
MAR 2 1971

(SEAL)
Attest:

Edward M. Fletcher, Jr.
Attesting Officer

WILLIAM E. SCHUYLER, JR.
Commissioner of Patents

Disclaimer 3,471,476.—*Ernst Gaeumann*, deceased, late of Zurich, Switzerland, by *Tino Gaeumann*, legal representative, Zurich, Switzerland, *Vladimir Prelog*, Zurich, *Hans Bickel*, Binningen, and *Ernst Vischer*, Basel, Switzerland. TRIHYDROXAMIC ACIDS. Patent dated Oct. 7, 1969. Disclaimer filed Oct. 22, 1984, by the assignee, *Ciba-Geigy Corp.*

Hereby enters this disclaimer to claims 1–3 and 8–10 of said patent.

[*Official Gazette January 1, 1985.*]